United States Patent
Lütolf et al.

(10) Patent No.: US 11,707,879 B2
(45) Date of Patent: Jul. 25, 2023

(54) ELECTRICALLY POWERED CRIMP TOOL

(71) Applicant: Ridge Tool Company, Elyria, OH (US)

(72) Inventors: Marc Lütolf, Kembs (FR); Sean Alan Davis, Cleveland, OH (US); Richard M. Kundracik, Cleveland, OH (US)

(73) Assignee: Ridge Tool Company, Elyria, OH (US)

( * ) Notice: Subject to any disclaimer, the term of this patent is extended or adjusted under 35 U.S.C. 154(b) by 415 days.

(21) Appl. No.: 16/861,407

(22) Filed: Apr. 29, 2020

(65) Prior Publication Data

US 2020/0276748 A1  Sep. 3, 2020

Related U.S. Application Data

(60) Division of application No. 15/429,978, filed on Feb. 10, 2017, now Pat. No. 10,675,805, which is a continuation-in-part of application No. 15/379,105, filed on Dec. 14, 2016, now Pat. No. 10,512,964.

(51) Int. Cl.
 *B29C 57/06* (2006.01)
 *B29C 53/08* (2006.01)
 *B25B 27/10* (2006.01)

(52) U.S. Cl.
 CPC ............ *B29C 53/086* (2013.01); *B25B 27/10* (2013.01); *B29C 57/06* (2013.01); *B29K 2023/06* (2013.01)

(58) Field of Classification Search
 CPC ...... B21D 39/048; B21D 39/046; B25B 7/02; B25B 7/146; B29C 66/861; B29C 66/814
 See application file for complete search history.

(56) References Cited

U.S. PATENT DOCUMENTS

| | | | |
|---|---|---|---|
| 3,481,373 A | 12/1969 | Blagojevich | |
| 4,926,708 A | 5/1990 | Dietrich et al. | |
| 6,053,025 A * | 4/2000 | Beetz | B25B 27/146 72/413 |
| 6,240,626 B1 | 6/2001 | Nghiem | |
| 6,644,638 B1 | 11/2003 | McCormick | |
| 6,739,172 B2 | 5/2004 | Wagner | |
| 6,883,795 B2 | 4/2005 | McCormick et al. | |
| 7,121,539 B2 | 10/2006 | McCormick et al. | |
| 7,331,109 B2 | 2/2008 | Tu | |
| 9,808,851 B2 | 11/2017 | Thorson | |
| 10,512,964 B2 * | 12/2019 | Lütolf et al. | B25B 27/146 |
| 2005/0160856 A1 | 7/2005 | Sugitani | |

(Continued)

FOREIGN PATENT DOCUMENTS

DE  102 57 005   6/2004
EP  3 075 492   10/2016

OTHER PUBLICATIONS

European Search Report, App. 17186770.8; dated Aug. 3, 2018; 20 pages.

*Primary Examiner* — Alison L Hindenlang
*Assistant Examiner* — Debjani Roy
(74) *Attorney, Agent, or Firm* — Mark E. Bandy; Rankin Hill & Clark, LLP

(57) ABSTRACT

Electrically powered crimp tools are described. Also described are methods of operating the tools and methods of crimping. The tools include a housing, an electric motor, a roller screw assembly, and a jaw assembly. In particular versions of the tools the jaw assembly includes a cam linkage member that is manually displaced by a user to more easily open the jaws after performing a crimp.

6 Claims, 24 Drawing Sheets

(56) References Cited

U.S. PATENT DOCUMENTS

| | | |
|---|---|---|
| 2005/0241359 A1* | 11/2005 | Viegener .............. B21D 39/046 |
| | | 72/416 |
| 2007/0137348 A1 | 6/2007 | Detjen |
| 2010/0300308 A1 | 12/2010 | Frenken et al. |
| 2014/0157522 A1 | 6/2014 | Lorini |
| 2015/0121706 A1 | 5/2015 | Zurcher |
| 2015/0251256 A1* | 9/2015 | Frenken ............. H01R 43/0428 |
| | | 100/234 |
| 2016/0252112 A1 | 9/2016 | Kehoe et al. |
| 2016/0288193 A1 | 10/2016 | Thorson et al. |
| 2018/0021840 A1 | 1/2018 | Thorson et al. |

* cited by examiner

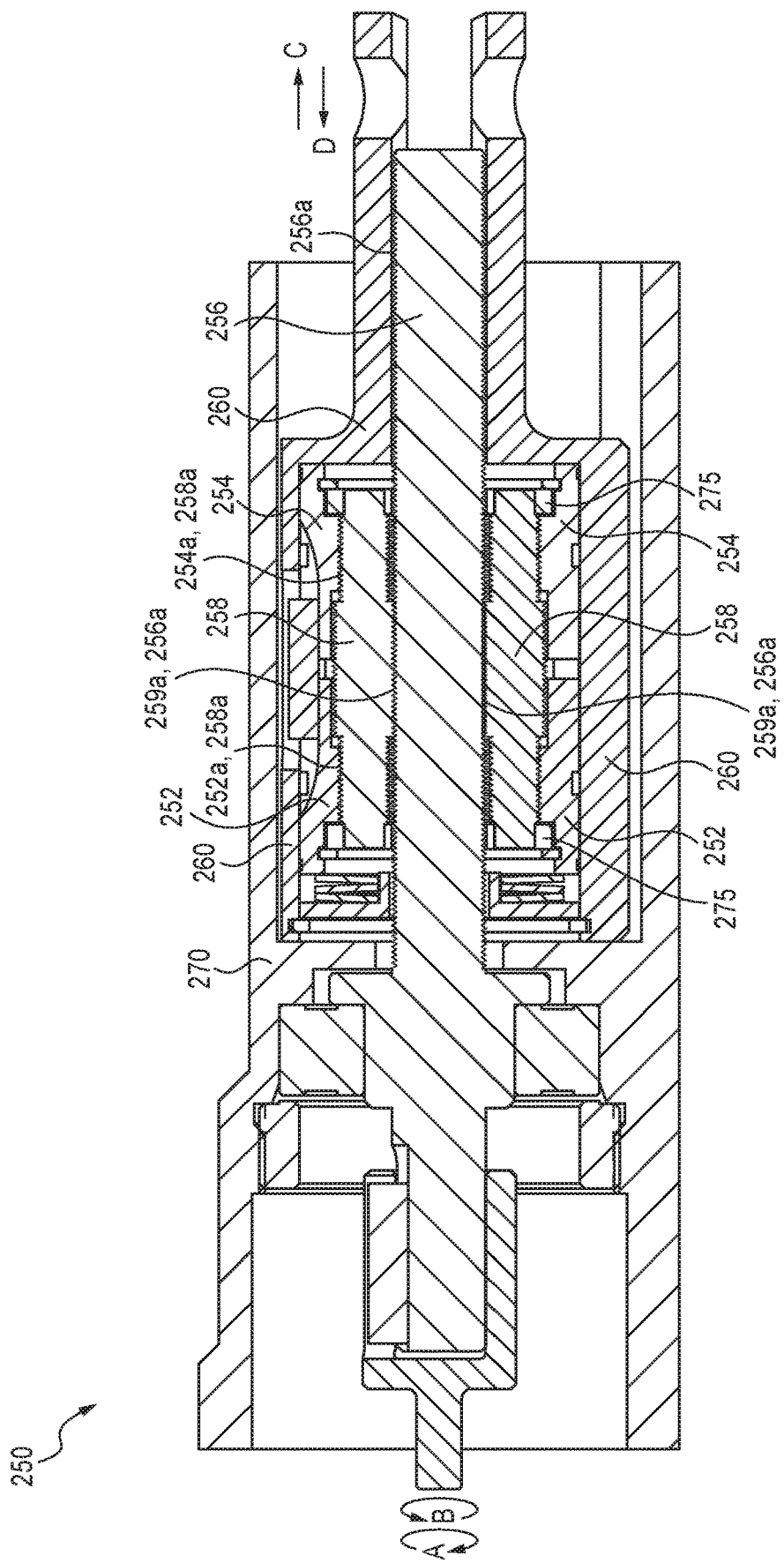

ELECTRICALLY POWERED CRIMP TOOL

CROSS REFERENCES TO RELATED APPLICATIONS

The present application claims priority upon and is a divisional application of U.S. application Ser. No. 15/429,978 filed Feb. 10, 2017, which is a continuation-in-part (CIP) of U.S. Ser. No. 15/379,105 filed Dec. 14, 2016, now U.S. Pat. No. 10,512,964.

FIELD

The present subject matter relates to electrically powered crimp tools and particularly, crimp tools for plastic crimping applications. The present subject matter also relates to jaw assemblies for use in crimp tools, methods of using the crimp tools, and methods of detecting completion of a crimping operation, and avoiding partial crimps.

BACKGROUND

Crosslinked polyethylene tubing (PEX) is widely used in plumbing applications for potable water. In such systems, connections are made using fittings which are crimped in place. There are currently many tools available for this application which can be categorized into three groups as follows.

Battery powered hydraulic tools are known. However, these tools are much more common for pressing metal systems as compared to applications involving pressing or crimping plastic systems. This is likely a result of the relatively high forces needed for metal systems and that are attainable using hydraulic systems.

Manual tools are also known. These tools are by far the most common for plastic crimping applications. The configurations of these tools are similar to various pliers used for other applications. A toggle or "over-center" mechanism is typically used to achieve mechanical advantage in these designs. However, these tools can lead to significant operator discomfort and exhaustion for applications in which many crimps must be made.

Battery powered mechanical tools for crimping have been proposed. A few tools exist which use a screw mechanism to apply force to a toggle mechanism similar to that used in manual tools.

Although satisfactory in many respects, a need remains for a battery powered crimp tool which overcomes various disadvantages associated with currently known crimp tools.

SUMMARY

The difficulties and drawbacks associated with previous approaches are addressed in the present subject matter as follows.

In one aspect, the present subject matter provides a jaw assembly adapted for engagement with a powered displaceable member. The jaw assembly comprises a first jaw and a second jaw which are positionable between a closed position and an open position. The jaw assembly also comprises a cam linkage member pivotally coupled to the first jaw by a cam pivot pin. The jaw assembly also comprises a lever coupled to the first jaw. The lever and the cam linkage member are positioned and configured such that the first jaw and the second jaw can be positioned toward the open position from the closed position by manually moving the lever so as to contact the cam linkage member and pivot the cam linkage member about the cam pivot pin. Each of the first jaw and the second jaw include at least one protruding member that projects from a working surface of a respective jaw. The protruding member is configured to react against forces exerted on die inserts when such die inserts are positioned along the working surface of each of the first and second jaws.

In another aspect, the present subject matter provides a handheld crimp tool comprising a tool housing defining a rear housing end and a generally hollow interior adapted for enclosing and supporting at least a portion of the components of the tool. The crimp tool also comprises an electric motor disposed and supported within the tool housing. The crimp tool additionally comprises a planetary roller screw assembly disposed and supported within the tool housing. The screw assembly is engaged with the motor and includes a nut and a screw threadedly engaged with the nut. Upon rotation of one of the nut and the screw, the other of the nut and the screw is linearly and axially displaced. The crimp tool also comprises a movable clevis engageable with one of the nut and the screw. The crimp tool further comprises a jaw assembly including (i) a first jaw and a second jaw which are positionable between a closed position and an open position, (ii) a cam linkage member pivotally coupled to the first jaw by a cam pivot pin, and (iii) a lever coupled to the first jaw. The lever and the cam linkage member are positioned and configured such that the first jaw and the second jaw can be positioned toward the open position from the closed position by manually moving the lever so as to contact the cam linkage member and pivot the cam linkage member about the cam pivot pin.

As will be realized, the subject matter described herein is capable of other and different embodiments and its several details are capable of modifications in various respects, all without departing from the claimed subject matter. Accordingly, the drawings and description are to be regarded as illustrative and not restrictive.

BRIEF DESCRIPTION OF THE DRAWINGS

FIG. 16 is a schematic cross sectional view of an alternate roller screw assembly used in tools of the present subject matter.

DETAILED DESCRIPTION OF THE EMBODIMENTS

Each of the tools or categories of tools noted in the background presents problems to which the present subject matter is addressed.

Battery powered hydraulic tools provide significantly greater force than is typically necessary for applications involving plastic crimping. For this reason, tools in this category are heavier and more costly than is practical or required for the application. Battery powered hydraulic tools also occupy a relatively large amount of space and are difficult for users to use in small or confined spaces. The present subject matter tools are lower in cost and more compact than currently available battery powered hydraulic tools.

The manual tools available are small and low cost, but require excessive amounts of user effort. Because approximately 100 crimps or more might be needed on a single job, the present subject matter tools solve the problem of user fatigue and improve productivity.

All currently known crimp tools employing a screw design, use a ball screw configuration. In contrast, the present subject matter tools use a planetary roller screw. This configuration allows for greater contact area between force transmitting components, e.g., screw and nut components. Thus, greater forces can be generated and/or transmitted with a smaller screw, with less wear, and with less heat generation as compared to corresponding crimp tools using a conventional ball screw configuration.

Figure 1:
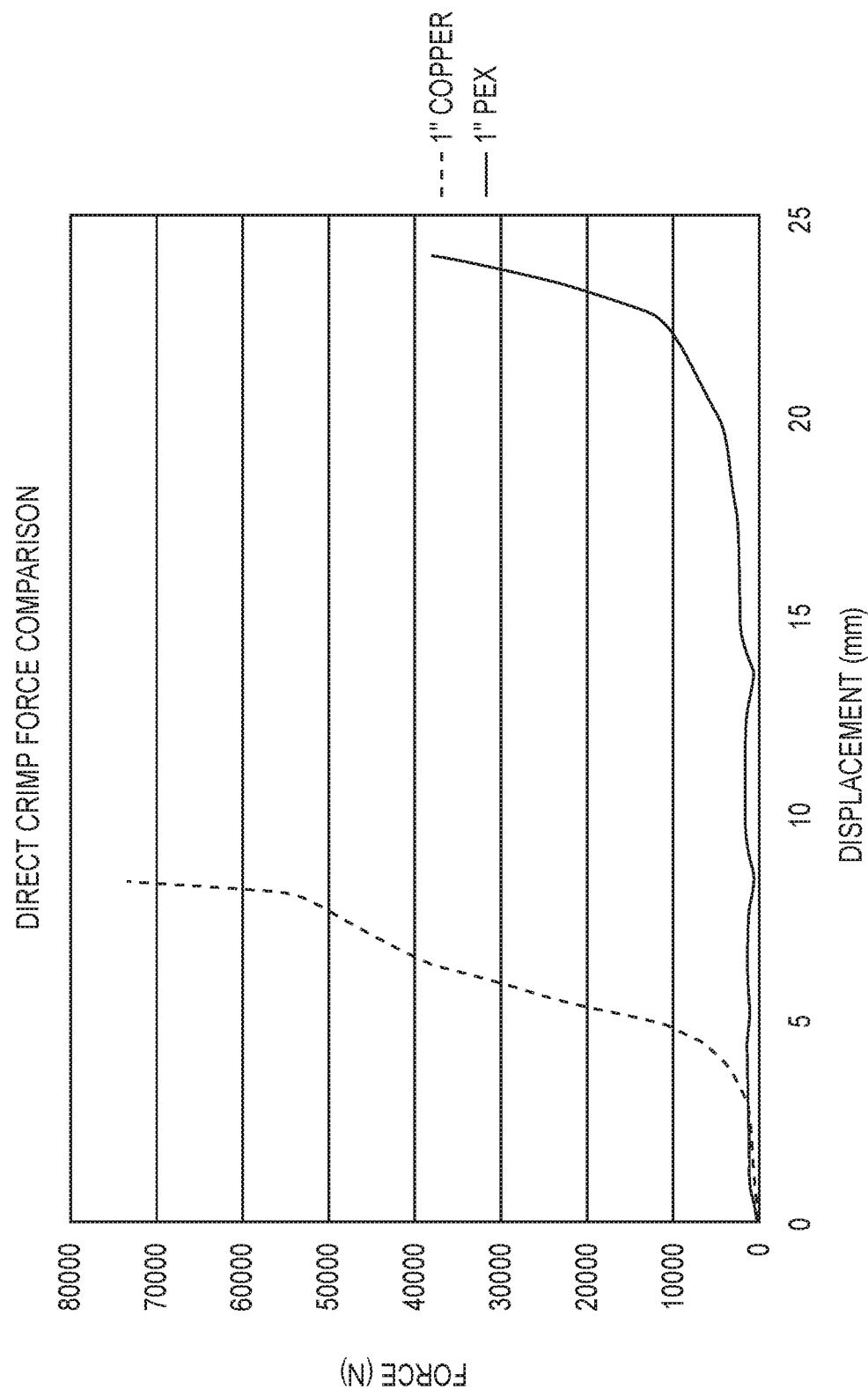
FIG. 1 is a graph comparing forces and travel for a typical copper pressing operation and a typical PEX pressing operation.

PEX crimps are unique from other forms of crimping in that the force required during the crimp increases rapidly as a function of travel. Although the force also increases with travel when crimping metal systems, e.g., copper or steel, the increase is more gradual and occurs earlier in the travel of the tool. FIG. 1 illustrates a comparison of a direct acting copper press operation and a PEX press operation. Not only is the overall force requirement greater for the copper press operation, but the work performed, i.e. the area under the curve, is also greater for the copper press operation because the force required increases over the entire range of displacement.

Figure 2:
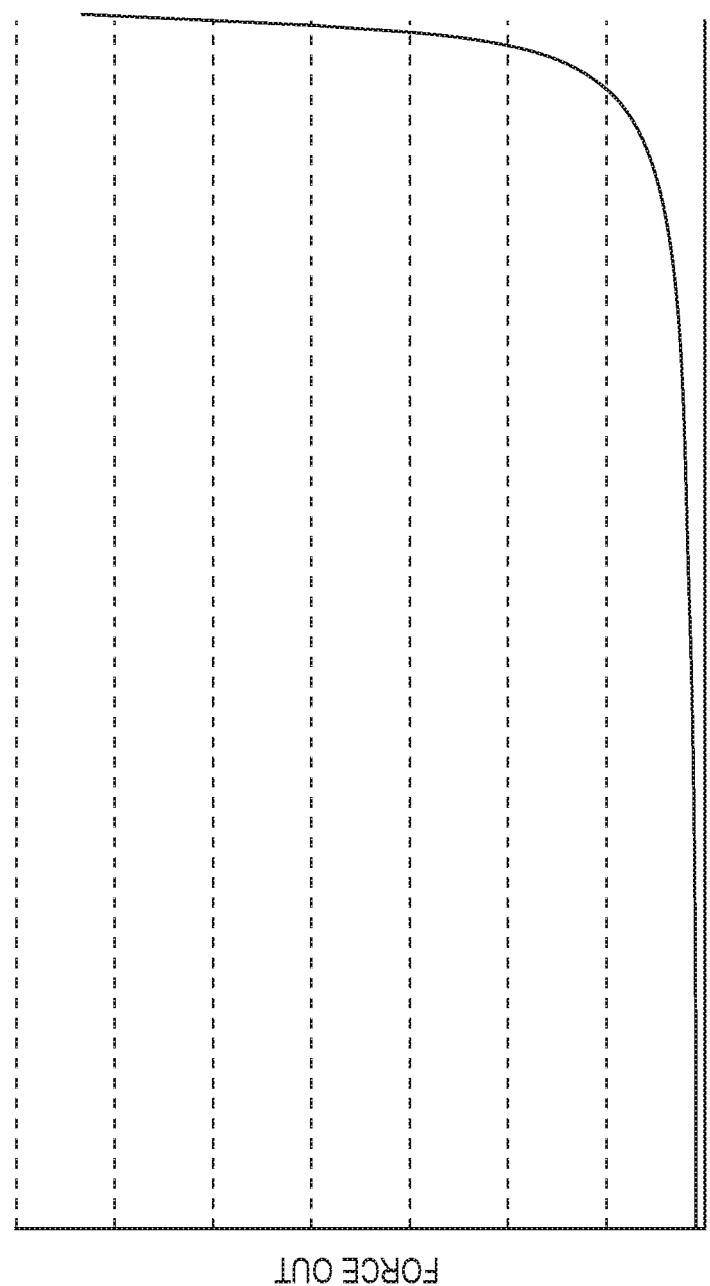
FIG. 2 is a graph of force versus travel associated with a representative system providing a mechanical advantage.

The difference between these force requirements results in a different jaw design strategy for each application. Jaws for metal systems typically utilize a linear cam design so that a relatively constant amount of force is applied after the crimp is initiated. That is, the mechanical advantage of the press jaw is somewhat constant. On the other hand, a toggle mechanism is typically used for crimping PEX because the mechanical advantage increases exponentially. FIG. 2 is a representative plot of force versus travel for a toggle system providing a mechanical advantage. A comparison of this plot to the curves in FIG. 1 reveals that the plot of FIG. 2 is similar in form to the force requirement of the PEX system illustrated in FIG. 1. A consequence of utilizing a toggle mechanism for a PEX crimping tool is that the peak linear force provided can be much less than the peak linear force that would otherwise result from using a cam based jaw design. Because the peak linear force is the most significant factor that determines the overall size and weight of a pressing or crimping tool, it is highly advantageous to use a toggle mechanism for PEX crimping applications in which requirements for peak linear force are not as great as compared to the requirements for crimping metal systems.

Despite the clear size and weight advantage of the toggle mechanism, a new problem is introduced by using a toggle mechanism in a pressing or crimping tool. Although other screw and toggle designs exist, these use a fixed coupling between the screw and clevis. This results in the jaws being biased open before the crimp is started. This is not a preferred operation for users because during a typical crimping operation, a user typically places a jaw assembly onto a fitting to ensure proper alignment before completing the crimp. Thus, press jaws are typically biased to a closed position with a spring for this reason. If users are unable to ensure proper alignment prior to crimp completion, then users need to advance the jaws under power and improper crimps are likely to result. In view of this concern, certain embodiments of tools of the present subject matter utilize a modified toggle mechanism in which the screw is not fixed to the clevis of the toggle mechanism and the assembly is biased such that the jaws are urged toward a closed position.

Another consequence of utilizing a mechanism that provides a relatively large mechanical advantage near or at the end of a pressing or crimping operation relates to opening the jaws. The high mechanical advantage of such a system at the end of a crimp does not allow a user to simply press on an outward facing portion of one of the press jaws to open the jaws and disengage the fitting. Thus, certain embodiments of the tools of the present subject matter include a lever which engages a cam assembly protruding from one of the toggle links of the jaw assembly. When the lever is pressed, a rotational moment is produced at a pivot between the link and the jaw. This causes a clevis spring to be displaced and the jaw to open. The cam of the toggle link is configured so that the lever provides direct force at or near the pin location.

Figure 3:
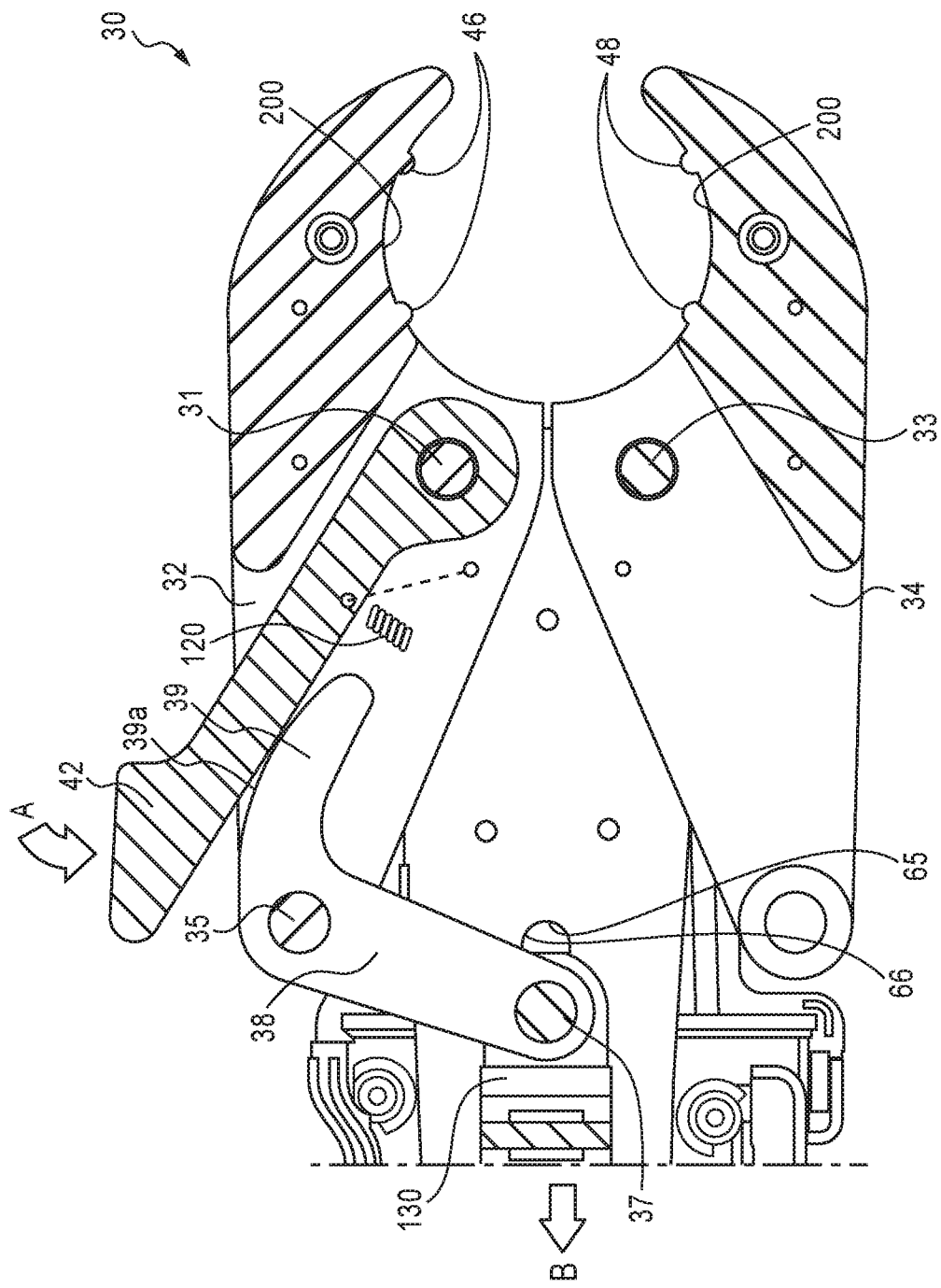
FIG. 3 is a schematic partial cross sectional view of an embodiment of a jaw assembly in accordance with the present subject matter.

Referring to FIG. 3, a schematic partial cross sectional view of an embodiment of a jaw assembly in accordance with the present subject matter is illustrated. FIG. 3 illustrates a jaw assembly 30 comprising a first jaw 32, a second jaw 34, and a jaw frame 36 to which each jaw 32, 34 is pivotally coupled by jaw pins 31 and 33, respectively. The jaw assembly 30 also comprises a linkage assembly that includes a cam linkage member 38 which is pivotally affixed to the jaw 32 by a jaw pin 35, and pivotally affixed to a clevis assembly 130 by a jaw pin 37. The clevis 130 is linearly displaced along or within a guide slot 66 upon actuation of a motor and roller screw assembly described in greater detail herein. The guide slot 66 is defined within one or more frame members of the jaw assembly 30. In many embodiments, the jaw assembly 30 also comprises a lever 42 that is pivotally supported at the jaw pin 31 of the first jaw 32. The lever 42 is positioned and configured to selectively contact a region of the cam linkage member 38, as described in greater detail herein. After performing a crimp operation such that the jaws 32, 34 are in a closed position as shown in FIG. 3, a user can easily open the jaws 32, 34 by pressing the lever 42 in the direction of arrow A. Pressing the lever 42, applies a rotational moment to the cam linkage member 38, which in turn linearly displaces the clevis 130 to move away from the jaws 32, 34, i.e., in the direction of arrow B, thereby opening the jaws.

Figure 4:
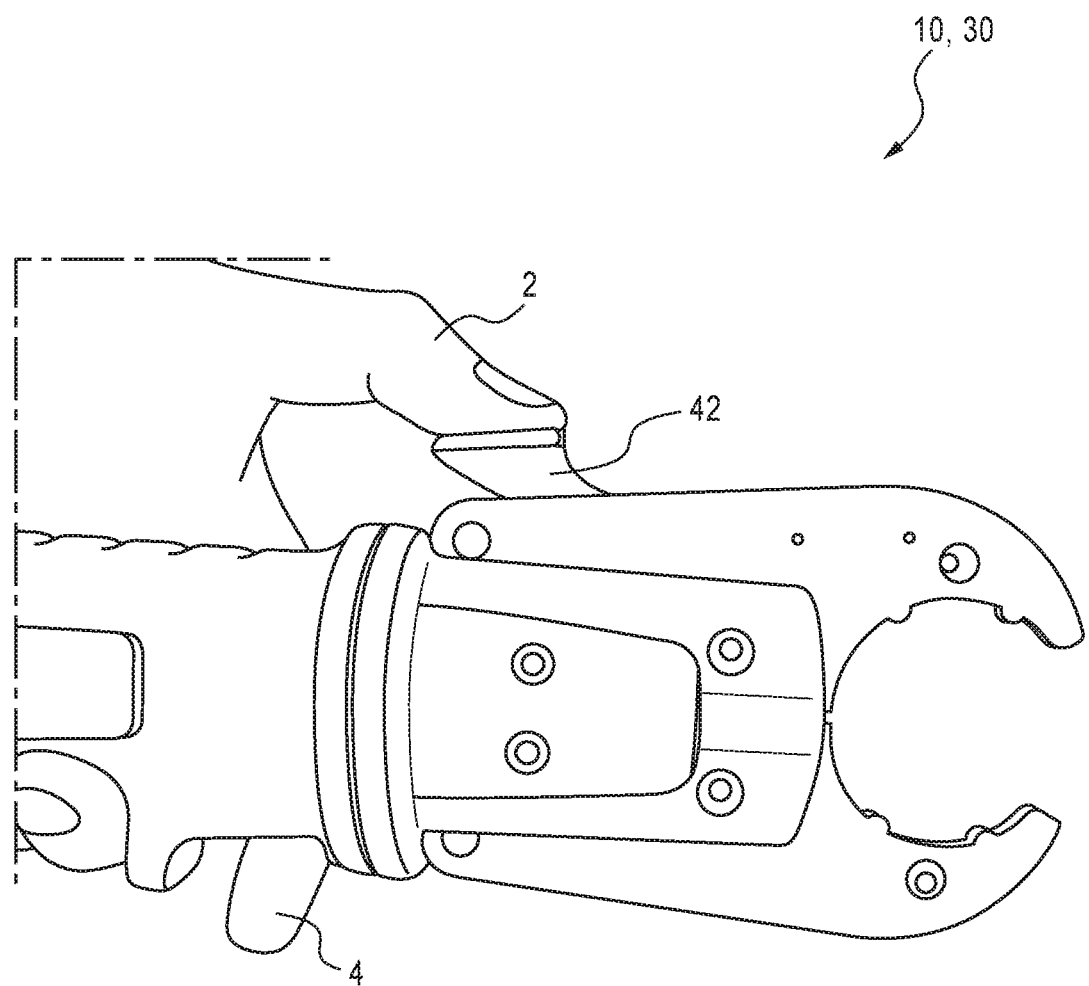
FIG. 4 illustrates a user holding an embodiment of a tool in accordance with the present subject matter, and depicts a typical hand position relative to components of the tool and its jaw assembly.

In view of these and other features, the tools of the present subject matter exhibit significantly improved usability and are more suitable for one handed use. A user can grip a workpiece such as plastic tubing and/or a fitting with one hand and engage the fitting with the tool to complete the crimp with the other hand. A typical hand position when operating a tool 10 in accordance with the present subject matter is depicted in FIG. 4 with a user's thumb 2 positioned on the lever 42 and forefinger 4 at a trigger position or other convenient location.

Another consequence of a crimping tool having jaws biased to a closed position relates to the use of die inserts with the tool. Because many crimping tools use die inserts to accommodate various crimp sizes, a user must change the inserts while holding the jaws open. It would be undesirable if the tool were allowed to advance while the user is attempting to change dies. Thus, in many tool embodiments of the present subject matter, a switch is provided that contacts the jaw assembly and/or clevis when the jaws are opened wide enough to allow the dies to be changed. This switch communicates with motor controls so that the trigger and/or motor are inoperable while the switch is actuated.

Various embodiments of the tools and methods for their operation and use are described herein as follows.

Tools and Jaw Assemblies

Although the terms "crimp" or variations thereof such as "crimping" are used herein, it will be understood that the present subject matter includes tools, assemblies, and/or methods, which are associated with pressing or other applications.

The tools of the present subject matter are periodically referred to as "handheld." The term "handheld" as used herein refers to a size and weight of the tool that enables the tool to be securely gripped and held by a user and repeatedly used in forming crimps. Although not wishing to be limited to any particular dimensions or weight, a typical overall length dimension of the tool including the jaw assembly is within a range of from 12 to 30 inches. A typical weight for the tool and jaw assembly is within a range of from 4 to 20 pounds. However, it will be appreciated that the present subject matter includes tools and jaw assemblies having lengths and/or weights outside of these representative ranges.

Figure 5:
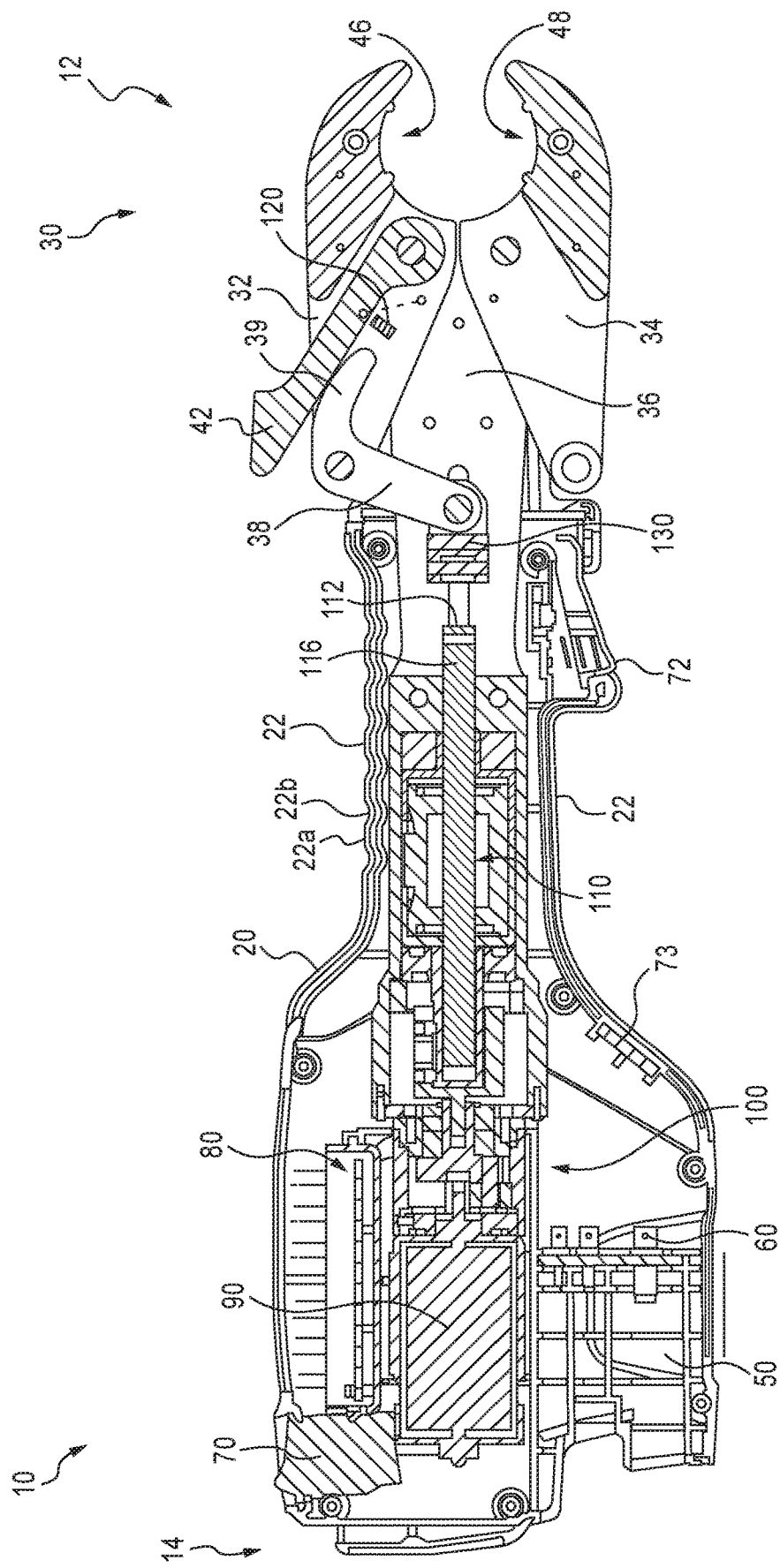
FIG. 5 is a schematic cross sectional view of an embodiment of a tool in accordance with the present subject matter.
Figure 6:
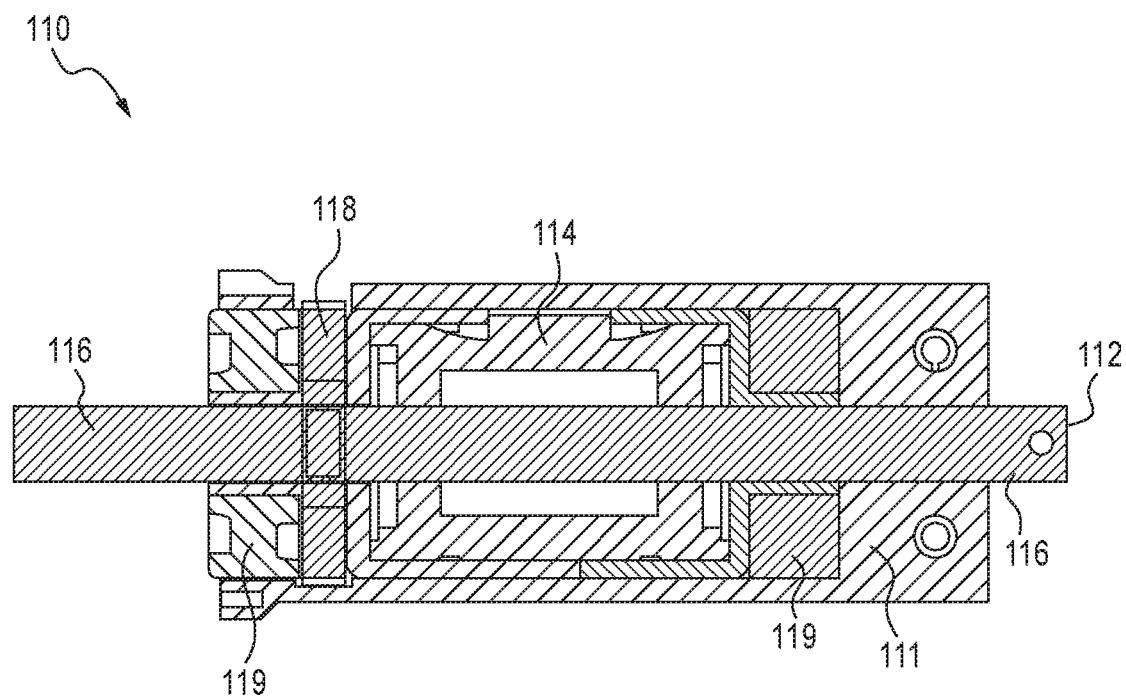
FIG. 6 is a schematic cross sectional view of an embodiment of a roller screw assembly used in various tools of the present subject matter.

FIGS. 5 and 6 schematically illustrate particular aspects of an embodiment of a tool utilizing a planetary roller screw assembly 110 in accordance with the present subject matter. Specifically, tool 10 comprises a housing 20 that generally encloses and/or supports various components of the tool. The tool 10 defines a forward end 12 and an opposite rearward end 14. The housing 20 defines a gripping region 22 that generally extends about a periphery of the housing 20 within a narrowed or neck region of the housing 20. One or more raised ridges 22a and/or recessed regions 22b can optionally be provided within the gripping region 22 and/or located along other regions of the housing 20 to promote gripping of the tool. The tool 10 also comprises a jaw assembly 30 generally disposed at or proximate the forward end 12 of the tool. The tool 10 also comprises a battery 50, one or more electrical terminals 60 for providing electrical communication between the battery 50 and an electric motor 90 and other components of the tool described in greater detail herein. Supported by and accessible along an exterior of the housing 20 is an activation switch 70. The tool 10 also comprises a gear assembly 100 which transmits rotary motion from the motor 90 to the planetary roller screw 110, all of which are generally enclosed within the housing 20. The tool 10 also comprises a moveable clevis assembly 130 at a distal end 112 of a threaded rod 116 of the planetary roller screw 110.

Referring further to FIG. 5, the tool 10 also comprises a jaw assembly 30 as previously described. The jaw assembly includes a first jaw 32 and a second jaw 34, each jaw being pivotally coupled to a jaw frame 36 by corresponding linkage members 38 and 40 (not shown), respectively. In a particular embodiment, one of the linkage members is provided as a cam linkage member 38. The cam linkage member 38 is configured and positioned such that the jaws 32, 34 can be positioned to an open position from a closed position by manually moving the cam linkage member 38 and pivot that member about a cam pivot pin. The jaw assembly 30 also includes a lever 42 which as described in greater detail herein, is selectively engageable with the cam linkage member 38. The lever facilitates pivoting of the cam linkage member. In certain embodiments, each jaw 32, 34 includes die retention provisions 46, 48, respectively and which are described in greater detail herein.

In certain embodiments, an On/Off toggle switch is used for the switch 70 to provide electrical power to a printed circuit board assembly (PCBA) 80 enclosed within the housing 20. In certain embodiments, the PCBA 80 is used to control a permanent magnet direct current (PMDC) motor that is used for the motor 90 that provides power to the gear assembly 100. In many embodiments, the PCBA 80 also provides one or more battery protection functions. In many embodiments, the motor 90 is engaged with a planetary gear assembly that is used for the gear assembly 100 that is engaged to a nut assembly 114 of a planetary roller screw 110.

Referring further to FIG. 6 which illustrates additional details of the planetary roller screw 110, as the nut assembly 114 is rotated by operation of the motor, a threaded rod or screw 116 is linearly displaced. The planetary roller screw 110 generally includes a housing 111 which encloses and supports a drive gear 118, bearings 119, the nut assembly 114, and the threaded rod 116. A distal end 112 of the threaded rod 116 is engageable with the clevis assembly 130 (not shown in FIG. 6) which closes the jaw assembly 30. In many embodiments, the threaded rod 116 is not fixedly coupled to the clevis assembly 130 (see FIG. 5). Instead, the clevis 130 is moveably displaceable independent of the rod 116 of the screw assembly 110. Thus, the rod 116 only applies force to the clevis assembly and jaw assembly while making a crimp and is disengaged from the clevis assembly when the rod retracts.

Referring to FIGS. 3 and 5, in many embodiments the jaw assembly 30 is biased to a closed position by one or more biasing member(s), e.g., tension spring(s), acting on the clevis assembly 130. A representative example of such a biasing member is described in association with FIG. 9. One of the two toggle linkage members of the jaw assembly 30, i.e., the cam linkage member 38, defines a forward extension 39 with a cam surface 39a. This cam surface 39a is in contact with a receiving surface 42a of the lever 42 that pivots about the two jaw pin 31. As shown in FIGS. 3, 4, and 5, a user's thumb can be used to depress the lever 42, rotate the cam linkage member 38 about the cam pivot pin 35, and open the jaws 32, 34 to engage a fitting (not shown) before a crimp is made. The lever spring 120 biases the lever 42 so that contact is maintained between the cam linkage member 38 and the lever 42 through a range of travel of the jaw 32. It will be appreciated that the present subject matter tools can utilize a wide array of other biasing members to bias the lever 42, instead of or in addition to the lever spring 120. Die inserts (not shown) are selectively coupled to die retention provisions 46, 48 provided in the jaws 32, 34 and engage a fitting or other workpiece (not shown). The inserts can be dedicated to specific applications, i.e. connection type and size.

Although the present subject matter tools are described herein as battery powered, it will be understood that the tools can include cords for transmitting electrical power to the tool. Such corded tools would typically not include a battery. Alternatively, such battery-free tools may simply include a port or other receptacle at which electrical power is powered.

Figure 7:
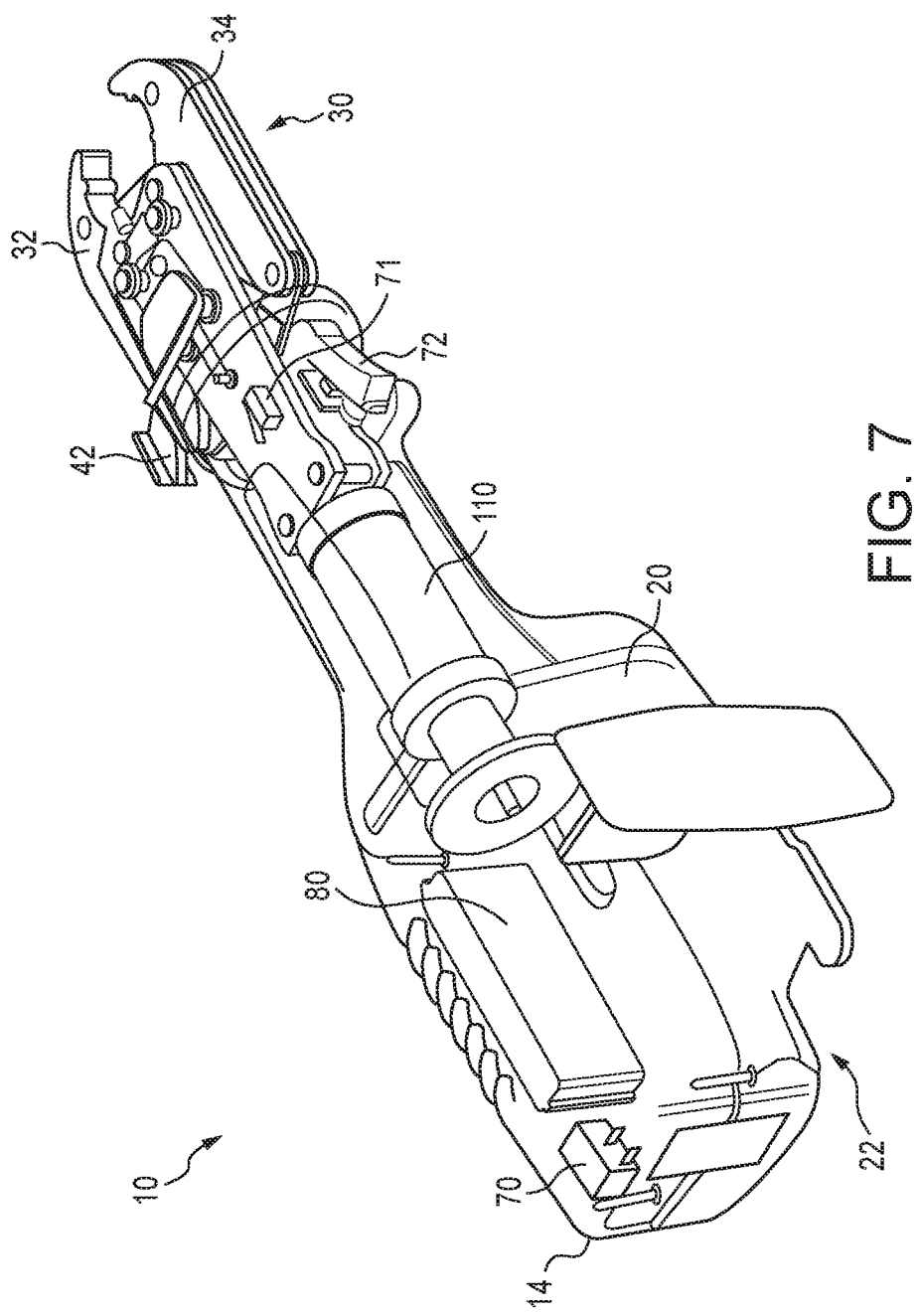
FIG. 7 is a schematic perspective view of an embodiment of a tool in accordance with the present subject matter illustrating various aspects of the tool.
Figure 8:
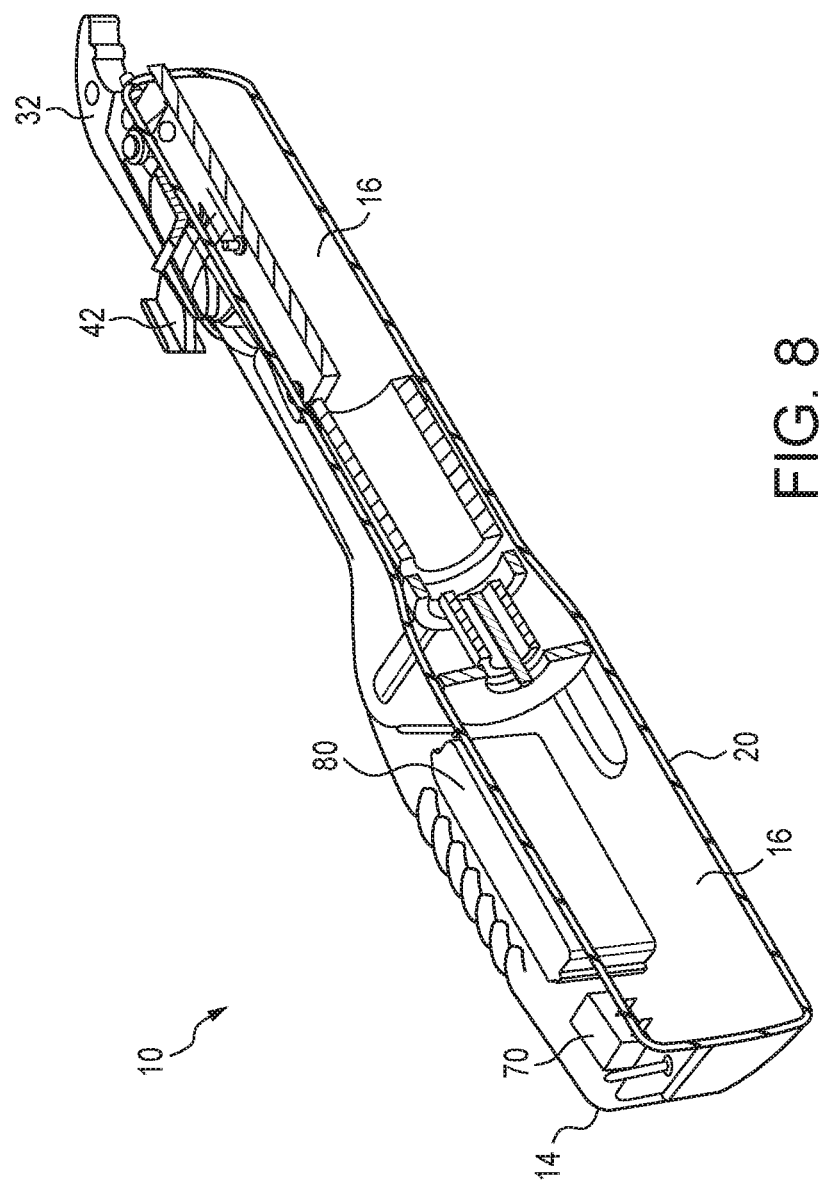
FIG. 8 is a schematic cut away view of the tool depicted in FIG. 7 showing additional aspects of the tool.

FIGS. 7 and 8 illustrate an embodiment of the tool 10 depicting additional aspects of the present subject matter. The tool 10 generally comprises a tool housing 20 that defines a rear housing end 14 and a generally hollow interior 16 for enclosing and supporting one or more components of the tool such as an electric motor (not shown) and a gear assembly (not shown) for transmitting rotary power to a planetary roller screw assembly 110. As previously described, the tool also comprises a jaw assembly 30 which is selectively opened and/or closed by operation of the motor which causes linear displacement of a rod of the roller screw assembly 110.

Referring further to FIGS. 5, 7, and 8, the tool 10 also comprises a region or compartment 22 of the housing 20 for receiving a battery (not shown). The battery provides electrical power to one or more electrical circuits which are generally included or provided by the previously noted PCBA 80. A wide array of battery types and configurations can be used. In many versions of the present subject matter tools, the battery is a lithium ion battery having an output voltage within a range of from about 12 volts to about 40 volts. However, it will be understood that the present subject matter tools can be configured for use with batteries having voltages outside of this range. The activation switch 70 serves as a primary control switch for providing electrical power from the battery to the motor and/or PCBA 80. The tool 10 also comprises a trigger switch 72 which provides for selective operation of the motor such as for example to open or close the jaw assembly 30 for example prior to, during, or after a crimping operation. In many embodiments, the tool 10 additionally comprises a reverse switch 73. In such versions, the trigger switch 72 only closes the jaw assembly 30, and the reverse switch 73 opens the jaw assembly 30. The reverse switch 73 is typically configured to override the trigger switch 72 at any time. The reverse switch 73 is in communication with the PCBA 80.

Figure 9:
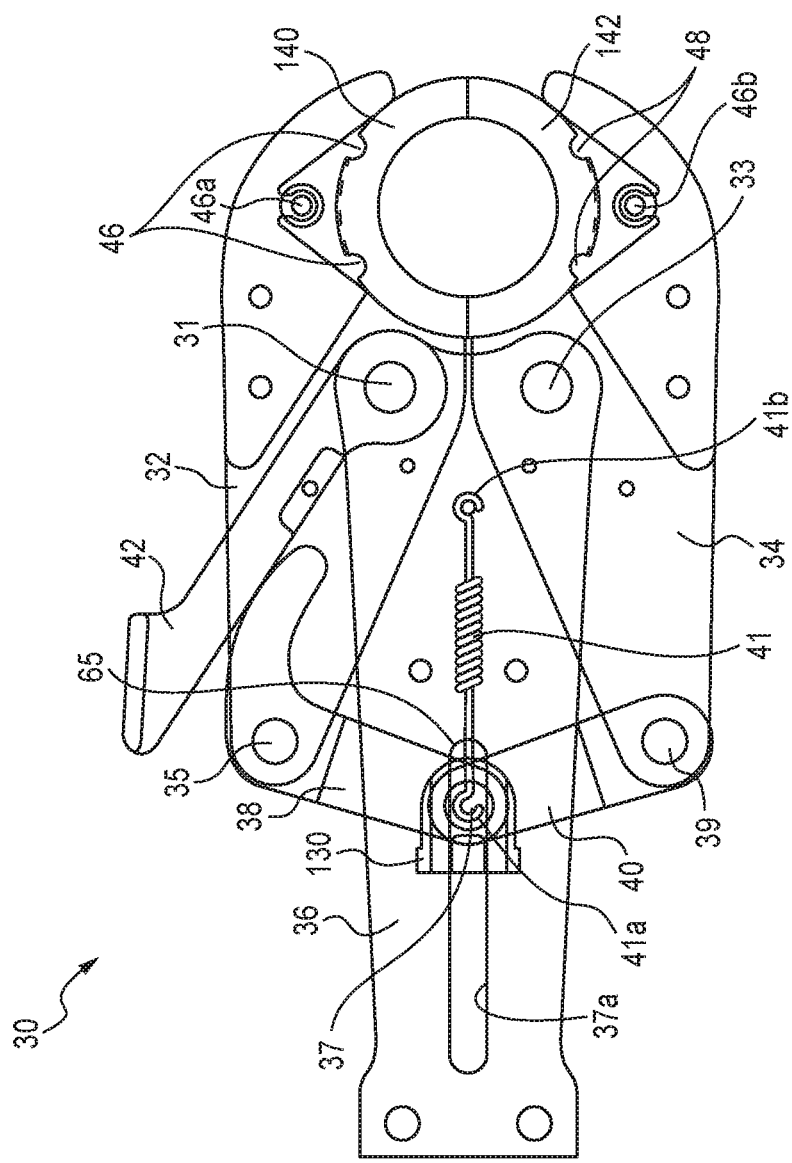
FIG. 9 is a schematic illustration of an embodiment of a jaw assembly in accordance with the present subject matter showing the jaws in a closed position.
Figure 10:
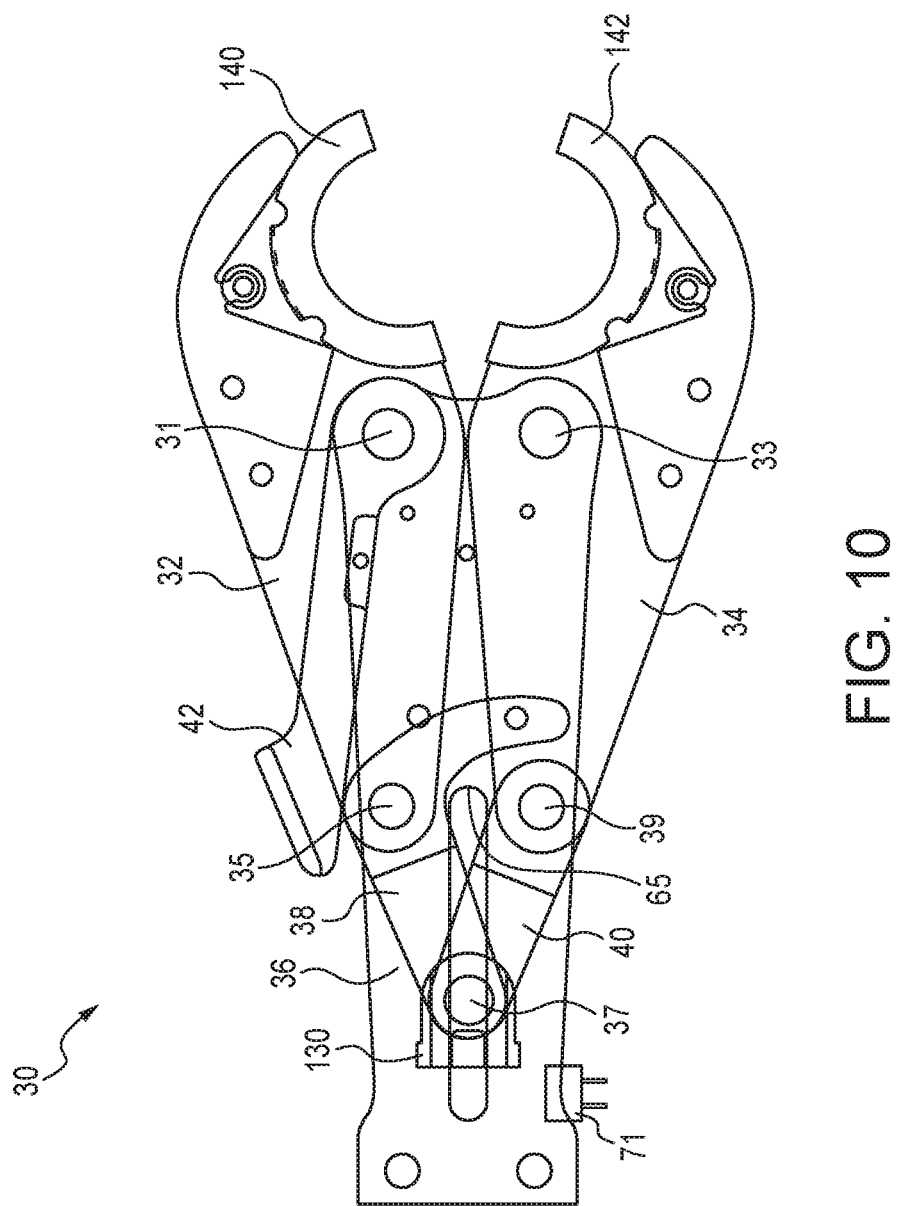
FIG. 10 is a schematic illustration of the jaw assembly of FIG. 9 in an open position.
Figure 11:
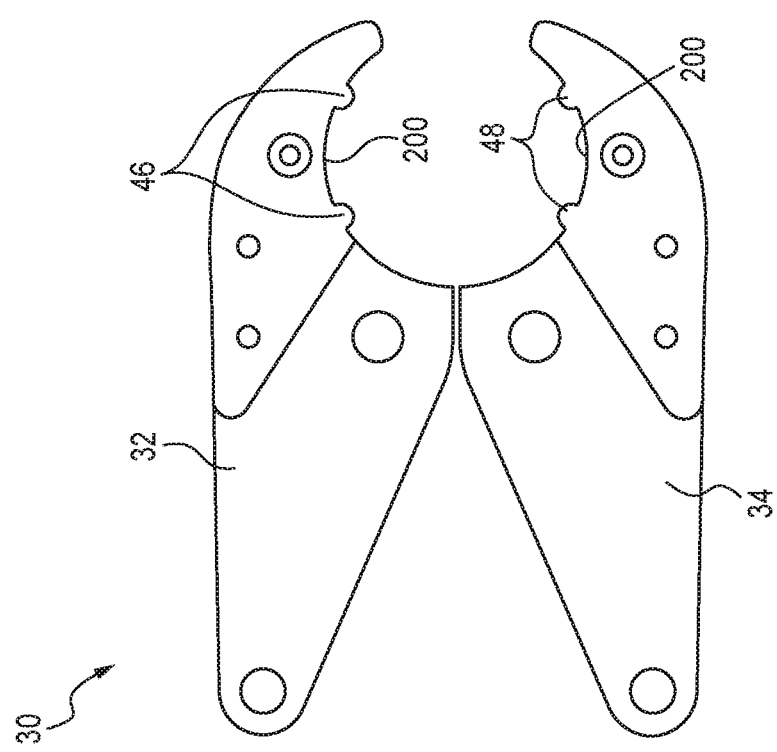
FIG. 11 is a schematic illustration of the jaws of the assembly of FIG. 9 shown without linkage members, a lever, and die inserts.

FIGS. 9-11 further illustrate aspects of the jaw assembly 30 of the present subject matter. FIG. 9 shows the jaw assembly 30 in which the jaws 32, 34 are in a closed position. FIG. 10 illustrates the jaw assembly 30 in which the jaws 32, 34 are in an open position. FIG. 9 illustrates the previously mentioned biasing member 41 which urges the jaws 32, 34 to a closed position. Although a variety of biasing members and/or biasing arrangements can be employed, a tension spring 41 extending between the previously noted jaw pin 37 and/or clevis assembly 130 which is slidably disposed in guide slot 37a defined in the jaw frame 36, and a mounting location on the jaw frame 36 is useful. Specifically, a first end 41a of the spring 41 is coupled with the jaw pin 37 and/or clevis assembly 130, and a second end 41b of the spring 41 is affixed at a suitable mounting location on the jaw frame 36. FIGS. 9 and 10 both depict a first die insert 140 removably retained in the first jaw 32, and a second die insert 142 removably retained in the second jaw 34. FIG. 11 illustrates the jaws 32, 34 without other components of the jaw assembly 30 and without the die inserts. In many embodiments, the jaw assembly 30 also comprises a jaw switch 71. The jaw switch 71 is in communication with the PCBA 80 and is typically configured to prevent the tool from closing, i.e., the trigger switch 72 is disabled when the jaws are opened wide enough to allow the dies to be changed. Thus, the jaw switch prevents operation of the motor during die changing.

In certain embodiments, the jaw assembly such as jaw assembly 30 shown in FIGS. 3 and 9, includes one or more protruding members 46, 48 that project from the working face 200 of one or both jaws, preferably both jaws, and which are configured to engage corresponding recesses or receiving regions in die inserts 140, 142. In a particular version, the jaw 32 includes a plurality of such protruding members 46, and the jaw 34 includes a plurality of such protruding members 48. In certain embodiments, each jaw includes two protruding members. The protruding members provide support for the die inserts 140, 142 to react against forces exerted on the dies 140, 142 during a crimping operation. In a particularly preferred versions the protruding members 46, 48 are configured to react exclusively against all forces exerted on the dies 140, 142 during a crimping operation and thus no such forces are exerted upon a pin(s) or other retaining member(s) utilized to attach or affix the dies 140, 142 to the jaws 32, 34 in an unloaded state. An example of such affixment pins are shown in FIG. 9 as pins 46a and 46b.

In certain embodiments, the tools of the present subject matter include one or more light assemblies along at least one of the tool housing and/or the jaws for illuminating the work region and/or the jaws. The light assembly typically includes one or more illuminating elements such as halogen lights, light emitting diodes (LEDs), or other light emitting components. The illuminating elements are typically powered by the on-board battery of the crimp tool. However, the present subject matter includes light assemblies utilizing dedicated or separate batteries apart from the battery used for powering the tool.

The light assembly can also be configured to provide information to an operator or user as to the status of the tool, state of a crimping operation, or other aspects of the tool and/or its operation. The previously described PCBA 80 in many embodiments includes electronics and data processing capabilities such that information concerning the tool and/or its operation such as error states for example, can be communicated to the operator by flashing or intermittent emission of light. For example, various flashing frequencies and/or number of flashes can be used to provide information to an operator. In such versions of the light assembly, provisions for providing information to an operator are incorporated in the light assembly and/or the PCBA 80.

Figure 14:
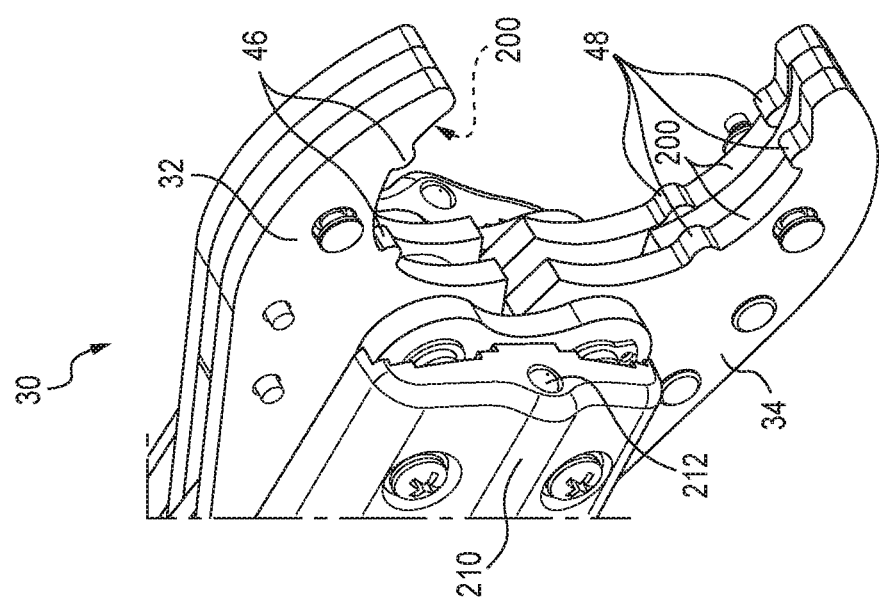
FIG. 14 is a perspective end view illustrating a light assembly optionally provided along the jaws of a tool in accordance with the present subject matter.

FIG. 14 illustrates a representative light assembly 210 optionally provided along the previously described jaw assembly 30. The light assembly 210 includes one or more illuminating elements 212 which in many embodiments, is oriented to direct light emitted therefrom toward the distal end of the jaws 32, 34.

The PCBA 80 can include electronic processing capabilities that place the tool in one or more various modes. Each mode has one or more characteristics that can extend battery life, improve usability of the tool, assist the user in determining a fault state, and/or provide information to the user. The one or more lights on the tool can be configured to provide indication to the user of the current state of the tool such as for example, by flashing at particular intervals or rates. Table 1 set forth below lists representative state indications for a tool as described herein.

TABLE 1

Representative State Indications for Tool Light(s)

| Mode | Light | Description/Action |
| --- | --- | --- |
| Active | ON | Tool ready for use. If unused for 5 minutes, tool will move into Standby Mode. |
| Standby | One brief flash every two seconds | Minimizes battery use. Press and release Run Switch to return to Active Mode. |
| Low Battery | Slow Flash, ON 1 second, OFF 1 second | Battery low. Tool will not run. Charge/Recharge battery. Battery out of specification temperature range. Bring battery temperature within correct operating range. |
| Battery Saver | Light OFF (ON/OFF Switch ON) | Battery very low. Tool will not run. Turn ON/OFF switch OFF. Change/Recharge battery. |
| Service Interval Approaching | Two short flashes followed by a pause. | Indicates service interval approaching. Will continue until Run Switch is pressed, then returns to Active Mode. Starts at 19,000 cycles. Tool is usable, but tool will lock after service interval. |
| Service | Rapid Flash. 10 flashes per second. | Tool has experienced a fault. Turn ON/OFF switch OFF. Remove battery for at least 15 seconds. Replace battery and turn ON/OFF switch ON. If Service Light continues to flash, take tool for service. Tool is locked. Tool has completed service interval (20,000 cycles) and requires service. |

Methods

General operation of the tool is as follows.

The unit is turned on with the activation switch 70 which is typically in the form of a toggle switch.

The jaws are biased to a closed position by one or more tension springs. A user engages the jaw lever 42 to open the jaws 32, 34 and fit the inserts 140, 142 about a workpiece or fitting. In many applications, the user will engage the jaw lever 42 with their thumb 2 as depicted in FIG. 4.

The user will at least partially release the lever 42 to allow the inserts 140, 142 to engage the fitting. This operation allows the user to align the inserts with the fitting to ensure a proper crimp. These operations can be repeated until the engagement is satisfactory.

Figure 12:
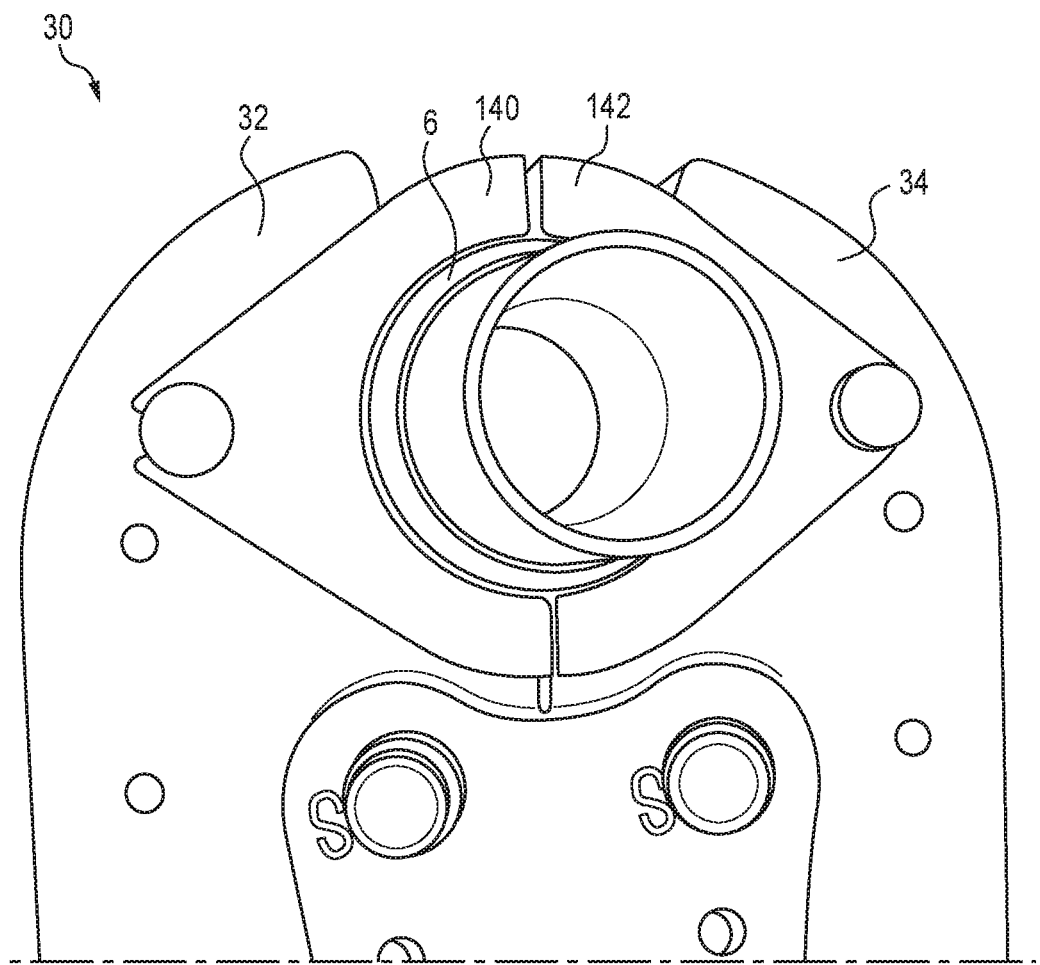
FIG. 12 is a detailed and representative view of a jaw assembly of a tool in accordance with the present subject matter, positioned about a workpiece after completion of a crimp.

With the same hand on the tool, the user will press the trigger 72 to initiate a press cycle. The threaded rod 116 will advance until the die inserts 140, 142 are fully closed and the press or crimp of a fitting or workpiece 6 is completed as shown in FIG. 12.

Figure 13:
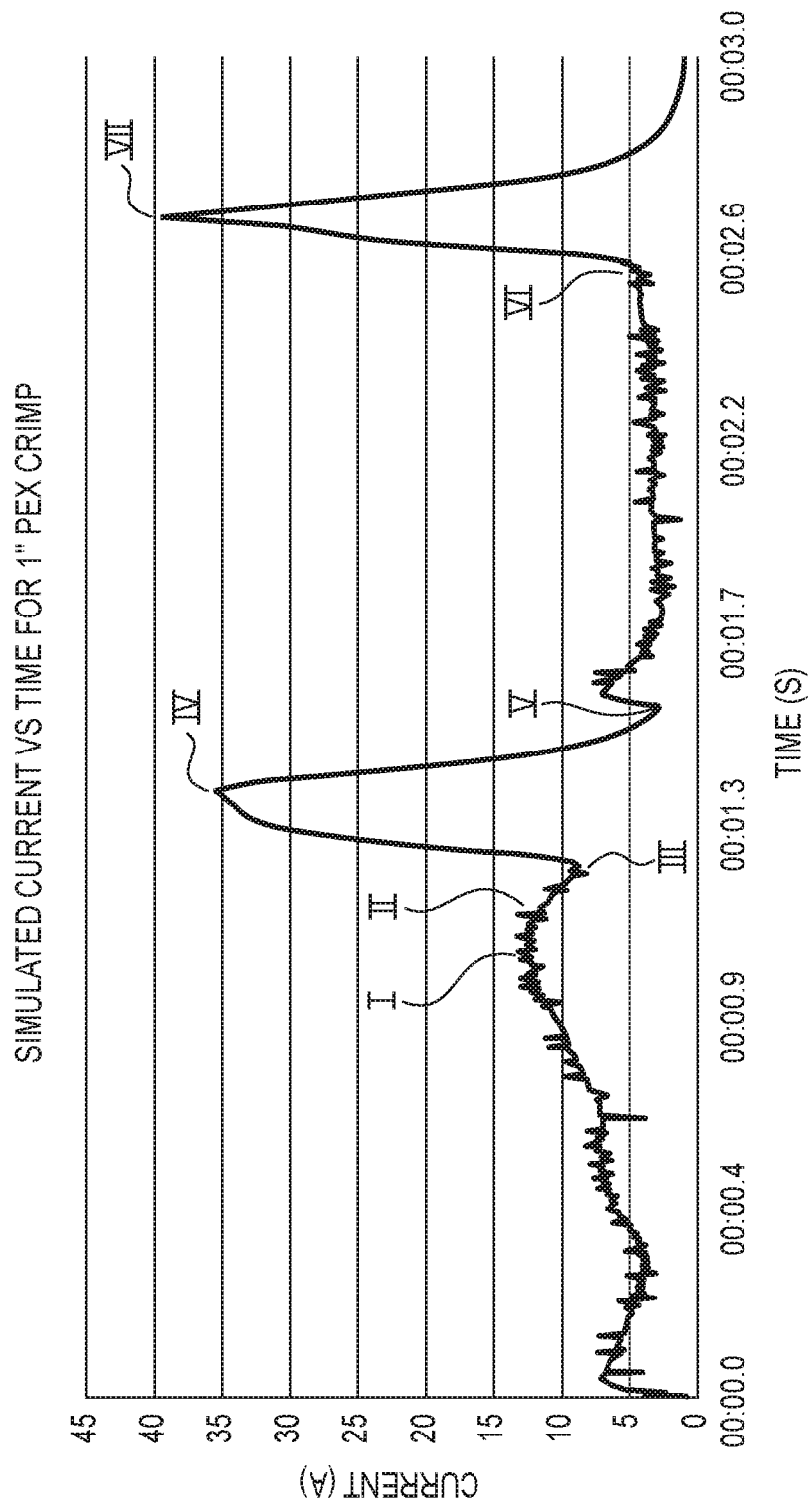
FIG. 13 is a graph of electrical current over time during a typical crimping operation using a tool of the present subject matter.

FIG. 13 is a graph of electrical current draw by the motor during a typical crimping operation using a tool of the present subject matter. During initial stages of a typical crimping operation, the current draw gradually increases or substantially so until the peak crimp current draw occurs at time I. Crimp completion shown at time II is typically characterized by a reduction in current draw from the peak occurring at time I. After crimp completion, current draw continues to decrease until time III at which the clevis assembly 130 reaches a "hard stop."

In many applications, the jaws 32, 34 deflect under the increasing mechanical advantage until the clevis 130 reaches a "hard stop" in the jaw frame 36. At this point, the torque of the motor 90 rises rapidly causing a current spike at time IV. The powered advance of the threaded rod 116 is interrupted by the PCBA 80 as a spike in current associated with end of travel is detected. It is the relatively large difference between the peak crimping current at time I and the threshold set to detect the current spike, i.e., current at time IV, that ensures the crimp is complete.

After a slight pause, the PCBA 80 initiates an automatic retraction of the clevis assembly 130 by reversing the motor (under no load). Initiation of this reversing operation is depicted as time V in FIG. 13.

Another hard stop is reached at the end of the retraction stroke at time VI. The PCBA 80 senses the associated current spike and turns the motor off until the trigger 72 is pulled or actuated again.

In many embodiments, the tool 10 is also provided with a reverse control or actuator to be used to retract the threaded rod 116 in cases when this is necessary during the middle of a press cycle, e.g. the fitting and inserts are not aligned properly. This reverse control is typically in the form of the previously described reverse switch 73 in communication with the PCBA 80.

In particular embodiments, a jaw switch 71 is provided on the jaw frame 36 to contact the clevis 130 when the jaws are partially or fully opened. This prevents the PCBA 80 from turning the motor on until the jaws are at least partially closed and therefore likely engaged with a fitting.

The present subject matter also provides a method of detecting completion of a crimping operation. The method generally comprises monitoring current draw of an electric motor such as motor 90 used to advance a screw or rod such as the threaded rod 116 that engages a clevis or other assembly which urges a jaw assembly toward a closed position. The method also comprises identifying a peak crimping current while performing the crimping operation. The method additionally comprises identifying a current threshold while performing the crimping operation. The method then calculates or otherwise determines the difference between the current threshold value identified and the peak crimping current value identified. Crimp completion typically occurs when the noted difference is at least 10%, in many applications 25%, in many applications 50%, in many applications 100%, in many applications 150%, in many applications 200%, in many applications at least 250%, and in particular applications at least 300% of the peak crimping current.

The present subject matter also provides methods of crimping a fitting or workpiece while avoiding forming partial crimps. The term "partial crimp" refers to a fitting, workpiece, or region of tubing for example that has not been fully crimped or properly deformed about a desired member. Partial crimps are undesirable because a sealing engagement is typically not formed along the interface and thus the partial crimp region must be removed, a new fitting or fresh portion of workpiece provided, and a new crimp operation must be performed. The noted methods of avoiding partial crimps comprise providing a crimp tool including (i) a tool housing that typically defines a rear housing end and a generally hollow interior adapted for enclosing and supporting at least a portion of the components of the tool, (ii) an electric motor disposed and supported within the tool housing, (iii) a planetary roller screw assembly disposed and supported within the tool housing, the screw assembly engaged with the motor and including a nut and a screw threadedly engaged with the nut, wherein upon rotation of one of the nut and the screw, the other of the nut and the screw is linearly and axially displaced, (iv) a movable clevis engageable with the other of the nut and the screw, (v) a jaw assembly including a first jaw and a second jaw which are positionable between a closed position and an open position, (vi) a trigger that activates the electric motor to thereby result in linear and axial displacement of the other of the nut and the screw, and (vii) a return actuator that upon actuation causes the other of the nut and the screw to be displaced to a home position corresponding to the jaws being positioned to the open position. The noted methods of avoiding partial crimps comprise positioning the jaw assembly to the open position. The methods additionally comprise placing the jaw assembly about a fitting to be crimped. The methods further comprise maintaining actuation of the trigger such that the electric motor provides rotary power to the planetary roller screw assembly which thereby urges the jaw assembly to the closed position. The tool is configured, typically via its controls, such that if at any time during closure of the jaw assembly, actuation of the trigger is not maintained such that closure of the jaw assembly is interrupted, the return actuator must be actuated to cause the jaws to be positioned to the open position thereby only then enabling subsequent actuation of the trigger. That is, if the trigger is not maintained in an actuated state such that closure of the jaw assembly is interrupted, subsequent actuation of the trigger without returning the jaws to the open position will not result in motor operation.

Additional Aspects

The present subject matter also includes tools that utilize an axial stop which limits linear extension of the roller screw assembly and/or the clevis such as clevis 130 and jaw pin 37. The axial stop limits extension or travel of the clevis prior to, or concurrently with, closure of the jaws such as jaws 32, 34. Referring to FIG. 3, an embodiment of an axial stop is shown as axial stop 65 which is in the form of an end wall of the guide slot 66 defined in the jaw assembly 30. As will be understood, the guide slot typically extends between two end walls, one end wall being located closer to the user and/or gripping region of the tool and the other end wall being located closer to the jaw assembly. The axial stop is typically the end wall nearest the jaw assembly. Using an axial stop such as axial stop 65 in the jaw assembly 30, results in contact between (i) the clevis 130 and/or jaw pin 37 and (ii) the axial stop 65 upon a predetermined full extension of the clevis 130 toward the jaws 32, 34. The full extension and contact between (i) clevis 130 and/or jaw pin 37, and (ii) axial stop 65 occurs at a point beyond the full closure of the crimp dies during the crimping process. Use and incorporation of an axial stop in a jaw assembly enables detection of complete jaw closure by monitoring current draw of the motor. A representative axial stop 65 is also depicted in FIGS. 9 and 10. The axial stop 65 is in the form of an end wall in the guide slot 37a defined in one or more of the frame member(s) of the jaw assembly 30. Referring to FIG. 13, contact between (i) and (ii) occurs at time IV. Thus, use and incorporation of an axial stop enables effective and reliable detection of the end of a crimping operation, and particularly prior to the toggle assembly passing "over-center." In many embodiments, use and incorporation of an axial stop provides a more pronounced and readily detectable strategy for identifying crimp completion. The resulting current spike occurring at time IV can be used to provide feedback, i.e., information, to the tool control system.

The present subject matter encompasses a wide array of axial stops. That is, the subject matter is not limited to an axial stop in the form of an end wall in a guide slot such as shown in association with axial stop 65 in FIG. 3. Instead, the present subject matter includes nearly any type of structural feature that physically limits linear travel or extension of the clevis and/or jaw pin or equivalent member. Thus, such structural features may for example be in the form of projection(s) or extension(s) in the travel path of the clevis, jaw pin, or other components.

Related to the incorporation of an axial stop in a jaw assembly, is a method of detecting jaw closure and/or crimp completion. Thus, the present subject matter includes methods of detecting jaw closure and/or crimp completion based upon monitoring current draw of an electric motor driving a jaw assembly and identifying a current spike or peak that occurs upon component(s) of the jaw assembly contacting the axial stop whereby further linear travel of such components is precluded.

Figure 15:
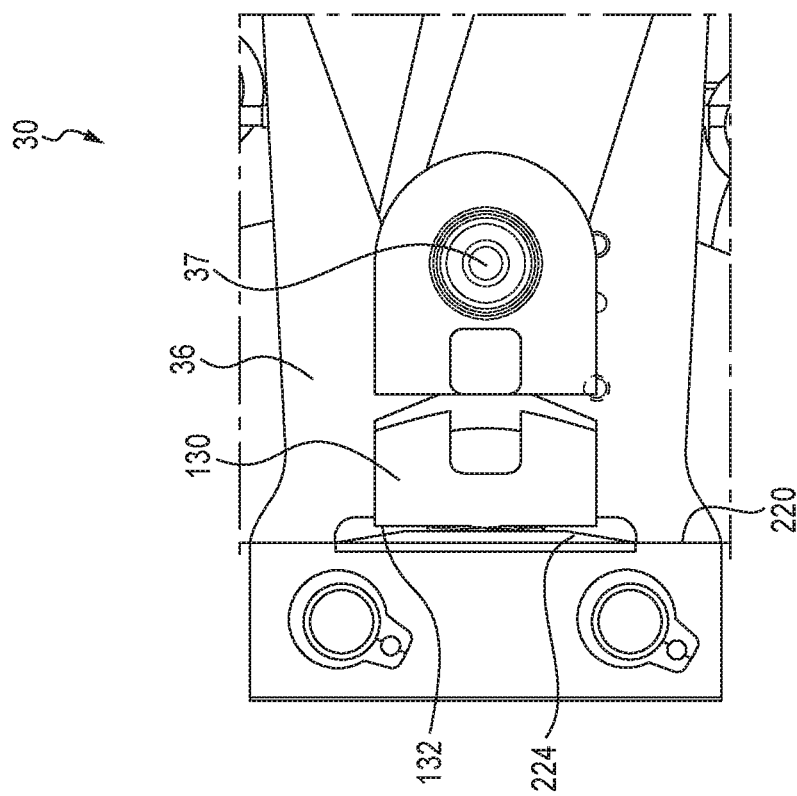
FIG. 15 is a detailed schematic view depicting an optional flexible element to reduce potential binding of an actuator assembly.

In certain embodiments, the tools of the present subject matter further include one or more flexible elements positioned within the tool or tool housing such that upon moving the clevis to its return or home position, the flexible element(s) is disposed between the clevis and a return stop or home position. As described herein, in certain embodiments, the return of the tool to a home position is detected by monitoring for a current spike such as spike VII in FIG. 13. It is desirable to control the slope of this spike. For example, a spike having too great of a slope could cause the screw to bind or otherwise become lodged in the assembly. Alternatively, a spike having a slope that is too small could cause the increase in current to not be detected. Accordingly, in certain embodiments such as shown in FIG. 15, one or more flexible element(s) 224 are provided between the clevis 130 and a return stop 220 provided in the tool and specifically, the jaw assembly 36. More particularly, the flexible element(s) can be in the form of spring washer(s) and are disposed between a rear face 132 of the clevis and the return stop 220. However, it will be appreciated that the present subject matter include the use of a wide array of flexible element(s) and is not limited to the use of spring washers.

Furthermore, in the descriptions herein, the planetary roller screw assembly is generally described as including a rotatable nut and a rod threadedly engaged with the nut, wherein upon rotation of the nut, the rod is linearly and axially displaced. However, it will be understood that the present subject matter includes embodiments in which the rod is rotatable and the nut is linearly and axially displaced. The crimp tools of the present subject matter can utilize a variety of different types of planetary roller screw assemblies.

A first type of roller screw mechanism includes rollers having an external thread engaging the external and internal threads of the rod (or screw) and of the nut. The threads of the rollers and the thread of the nut have helix angles that are identical to each other and different to that of the thread of the screw such that, when the screw rotates in relation to the nut, the rollers rotate on themselves and roll about the screw without moving axially inside the nut. The rollers are rotationally guided parallel with the axis of the screw by teeth provided on the nut and engaging teeth of the rollers. Such a mechanism is referred to herein as a standard planetary roller screw. The present subject matter tools may be equipped with a standard planetary roller screw in which the screw is rotated to linearly displace a nut, or a standard planetary roller screw in which the nut is rotated to linearly displace a screw.

A second type of roller screw mechanism has a similar operating principle but is different as a result of an inverted arrangement. The helix angles of the threads of the rollers, of the rod (or screw) and of the nut are selected such that, when the screw rotates in relation to the nut, the rollers rotate on themselves about the screw and move axially in the nut. The rollers are rotationally guided parallel with the axis of the screw by teeth provided thereon and engaging teeth of said rollers. Such a mechanism is referred to herein as an inverted planetary roller screw. The present subject matter tools may be equipped with an inverted planetary roller screw in which the screw is rotated to linearly displace a nut, or an inverted planetary roller screw in which the nut is rotated to linearly displace a screw.

Figure 17:
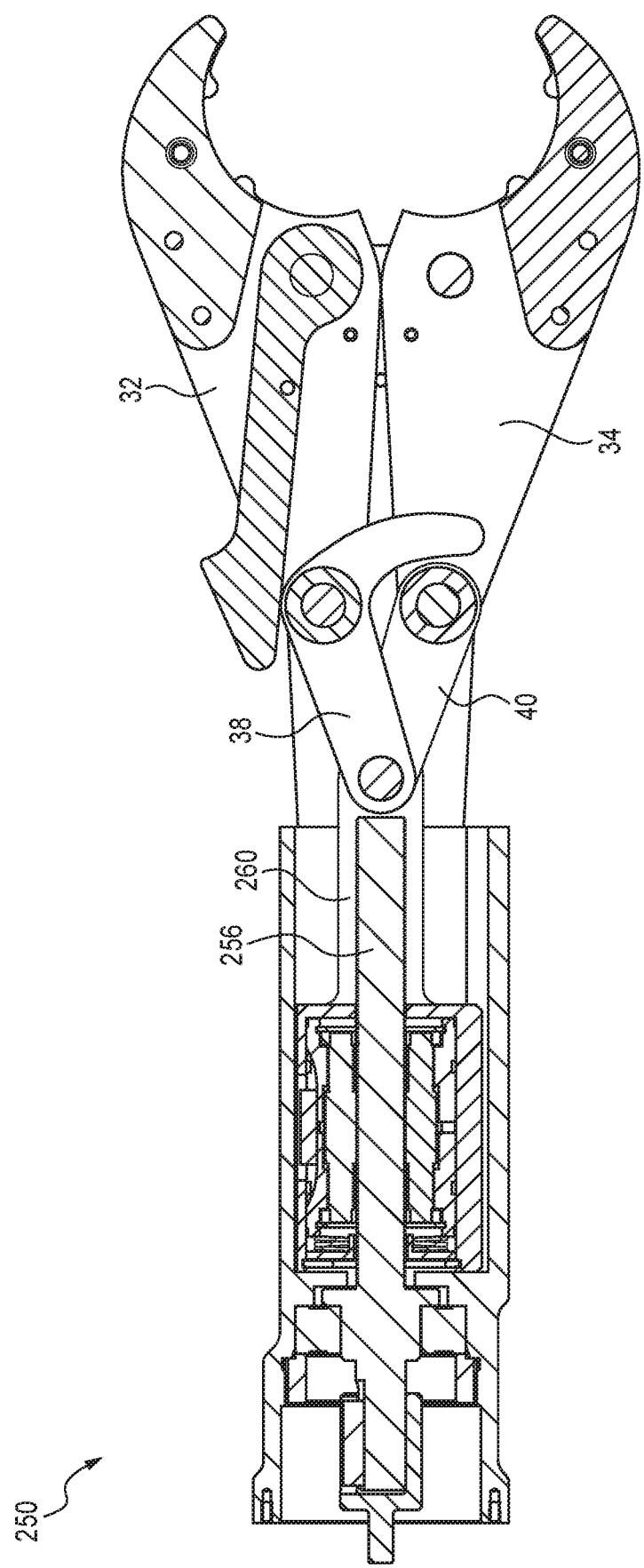
FIG. 17 is a schematic cross sectional view of a tool using the alternate roller screw assembly illustrated in FIG. 16.
Figure 18:
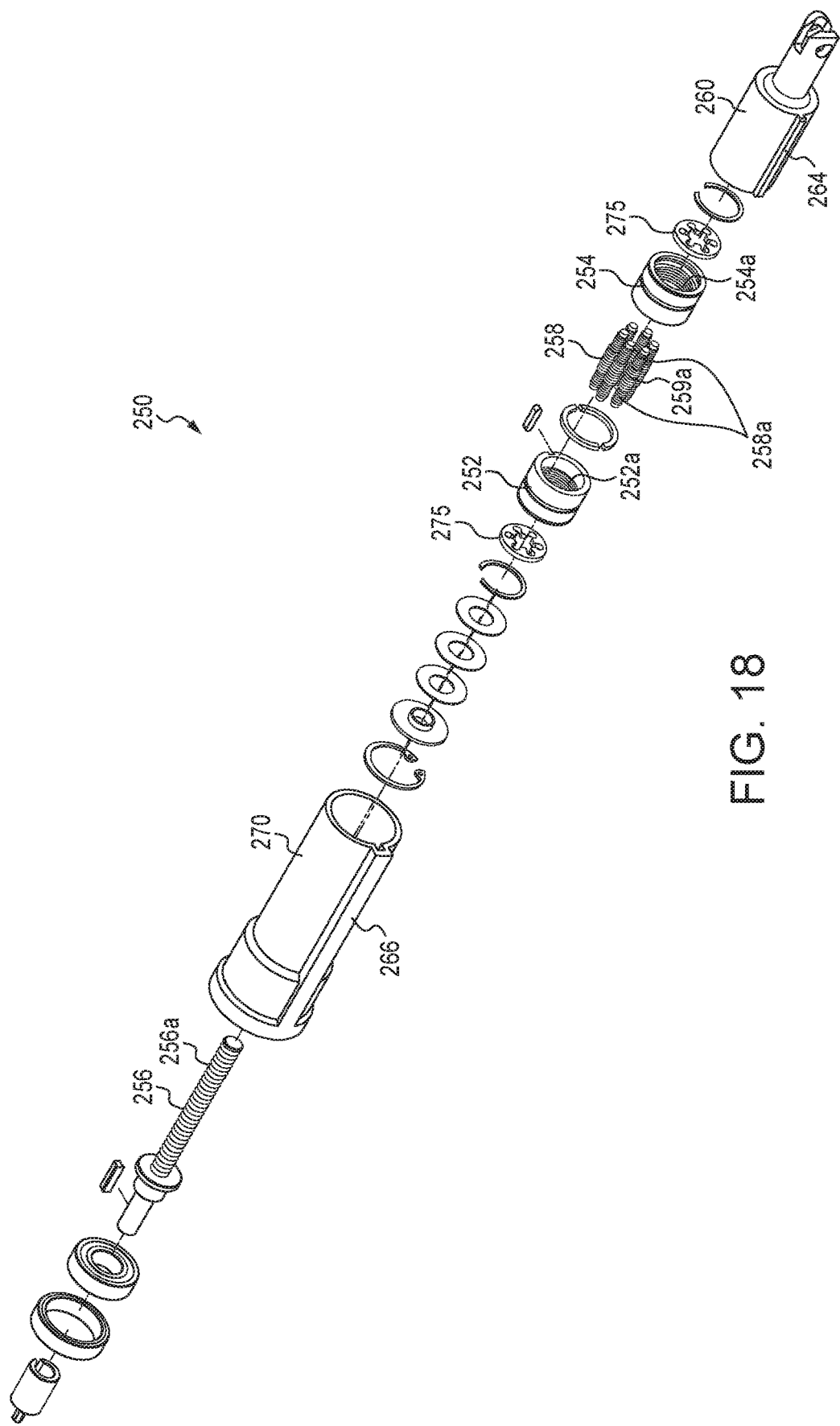
FIG. 18 is an exploded assembly view of the alternate assembly of FIG. 16.
Figure 19:
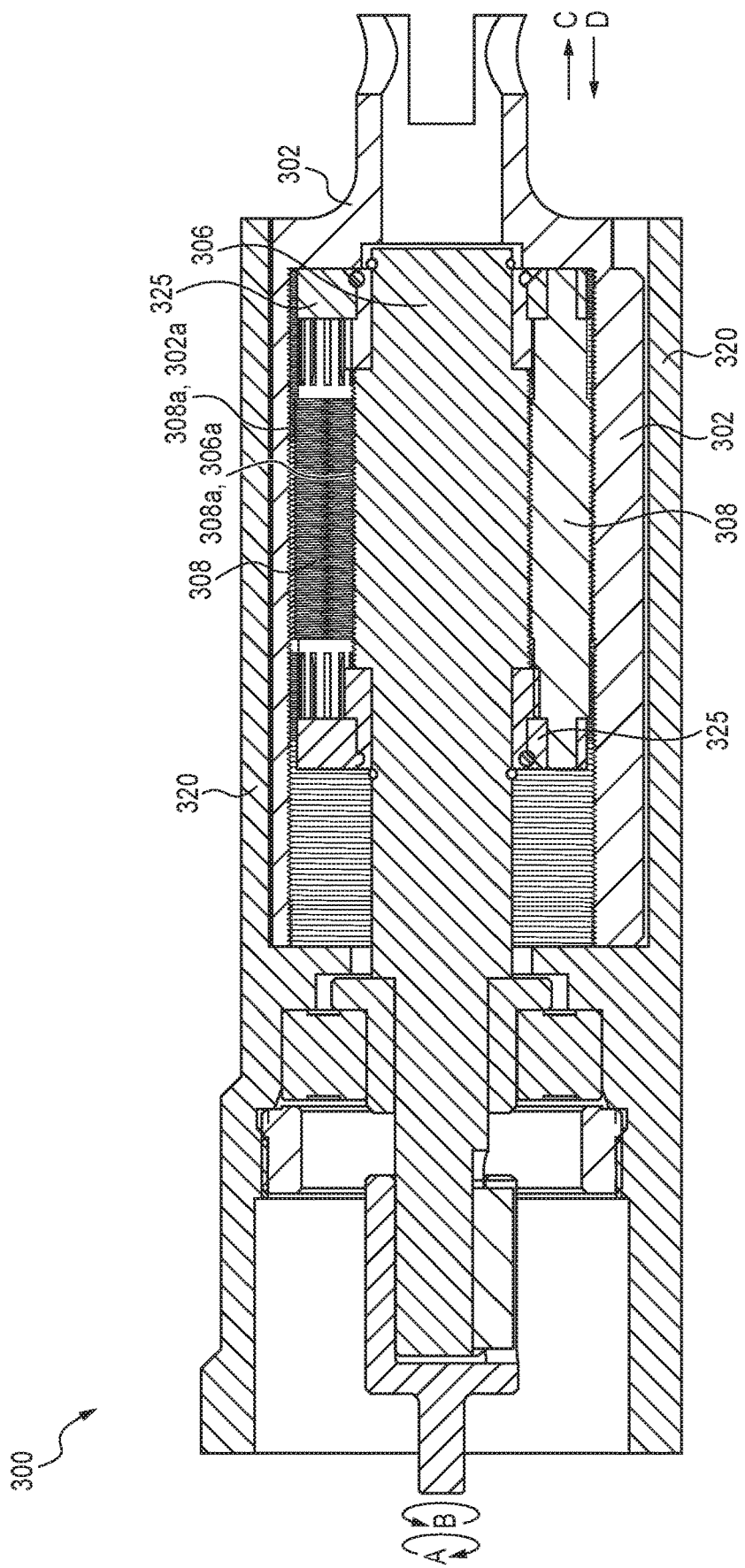
FIG. 19 is a schematic cross sectional view of another alternate roller screw assembly used in tools of the present subject matter.
Figure 20:
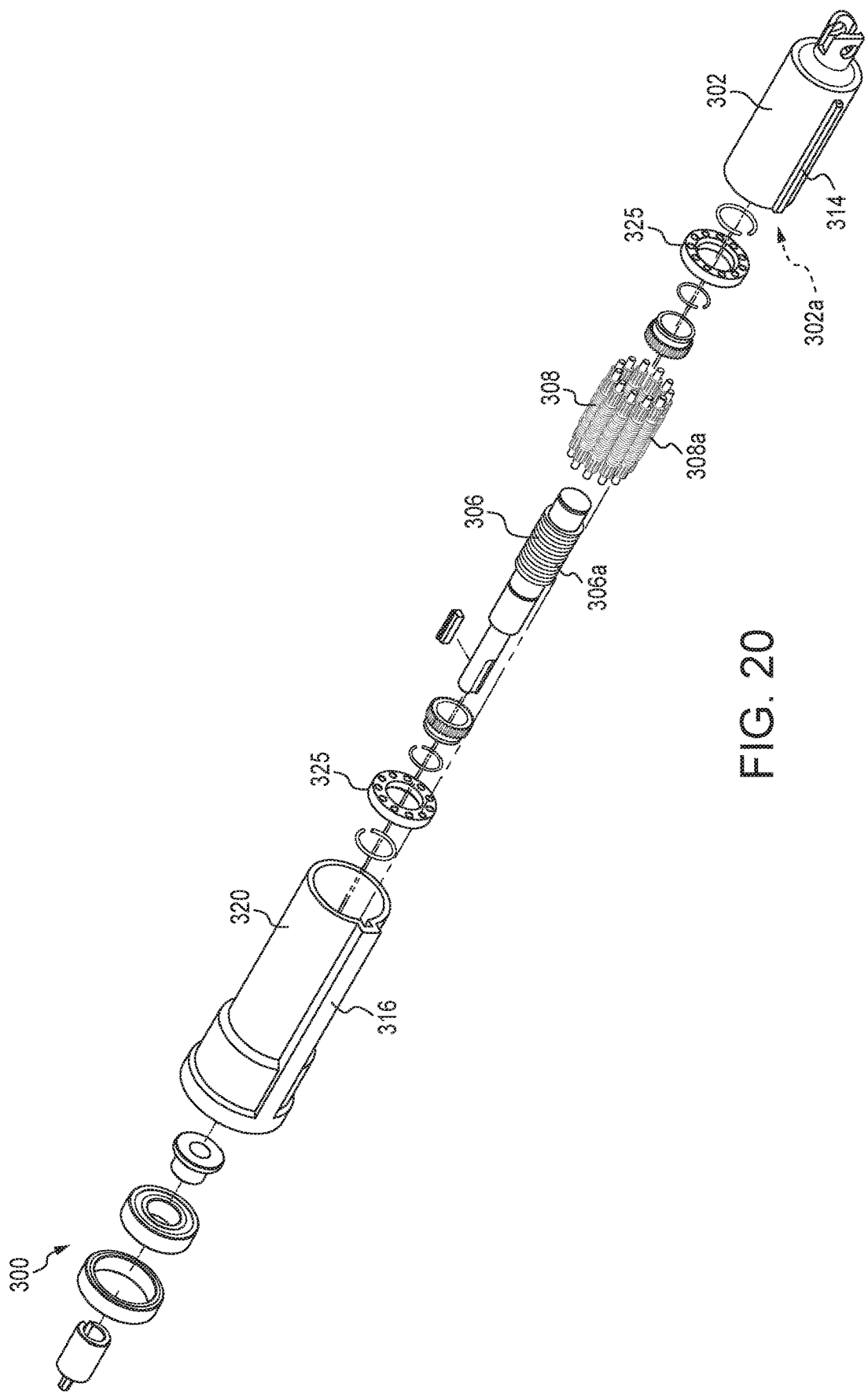
FIG. 20 is an exploded assembly view of the alternate assembly of FIG. 19.
Figure 21:
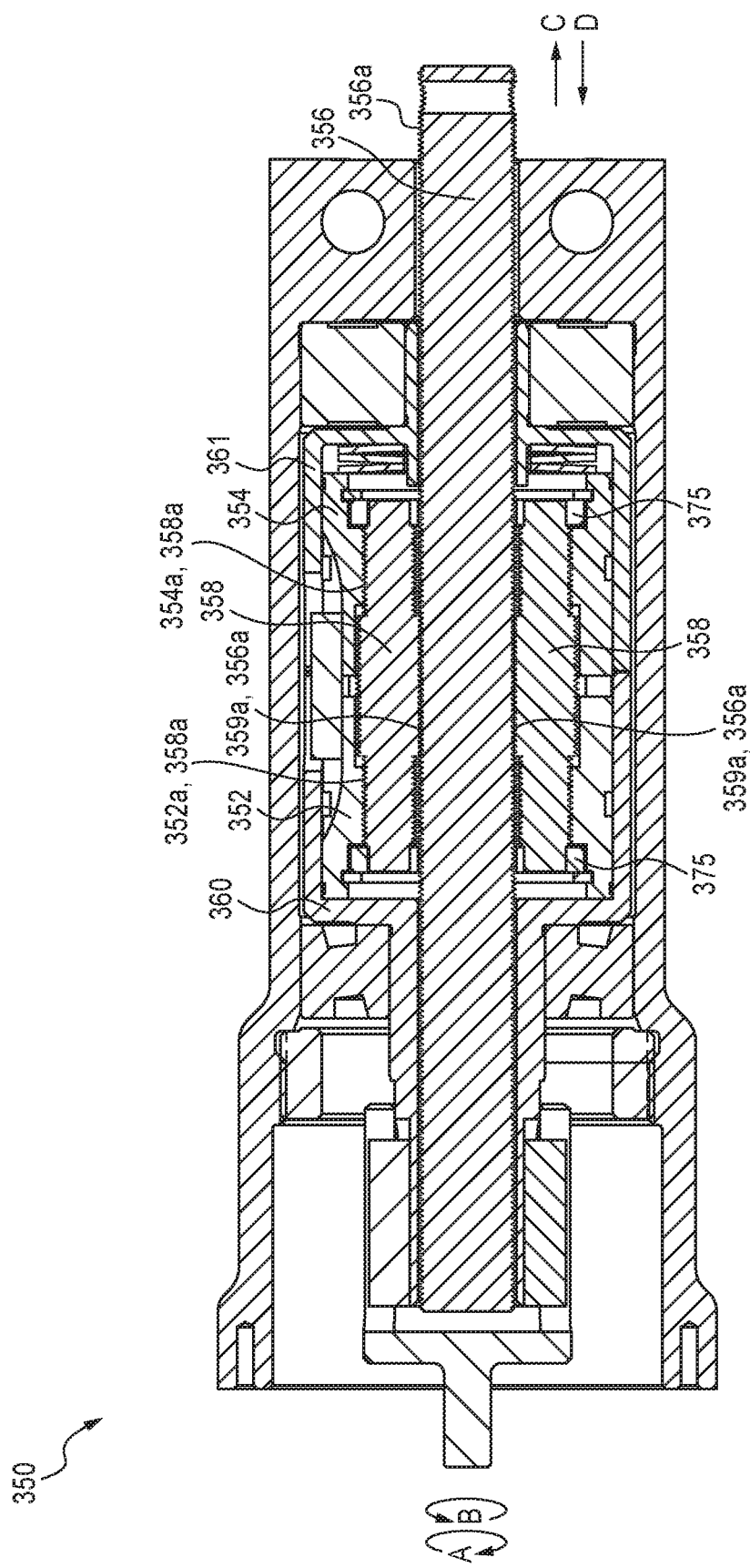
FIG. 21 is a schematic cross sectional view of another alternate roller screw assembly used in tools of the present subject matter.
Figure 22:
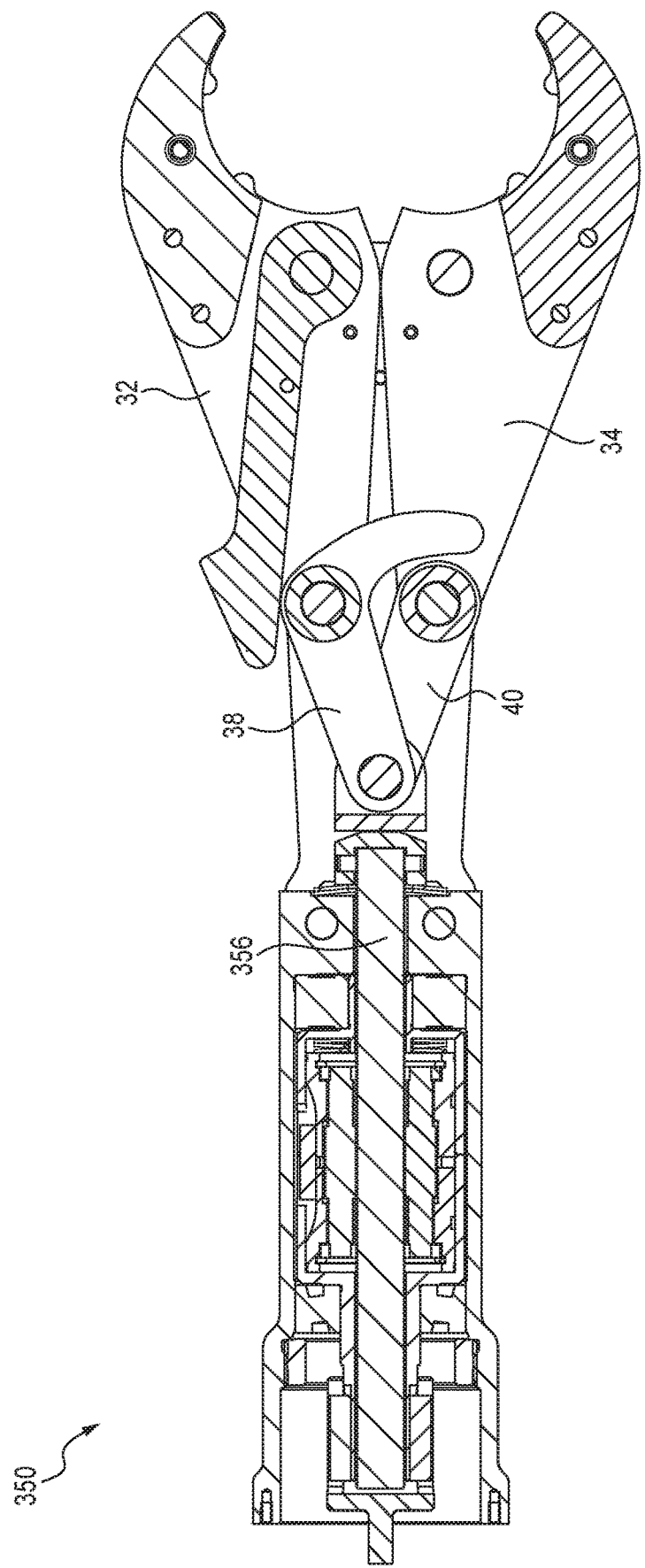
FIG. 22 is a schematic cross sectional view of a tool using the alternate roller screw assembly illustrated in FIG. 21.
Figure 23:
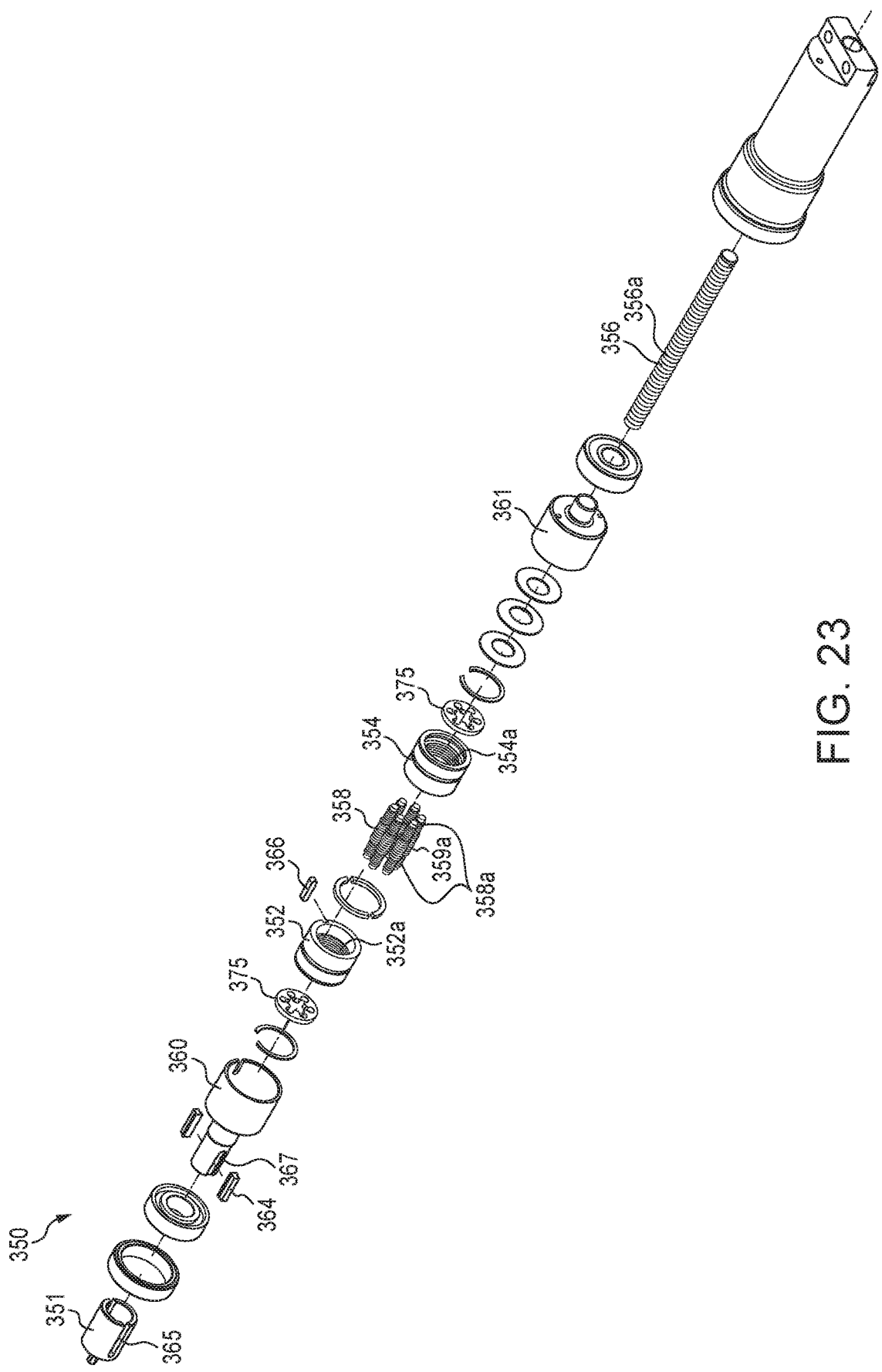
FIG. 23 is an exploded assembly view of the alternate assembly of FIG. 21.
Figure 24:
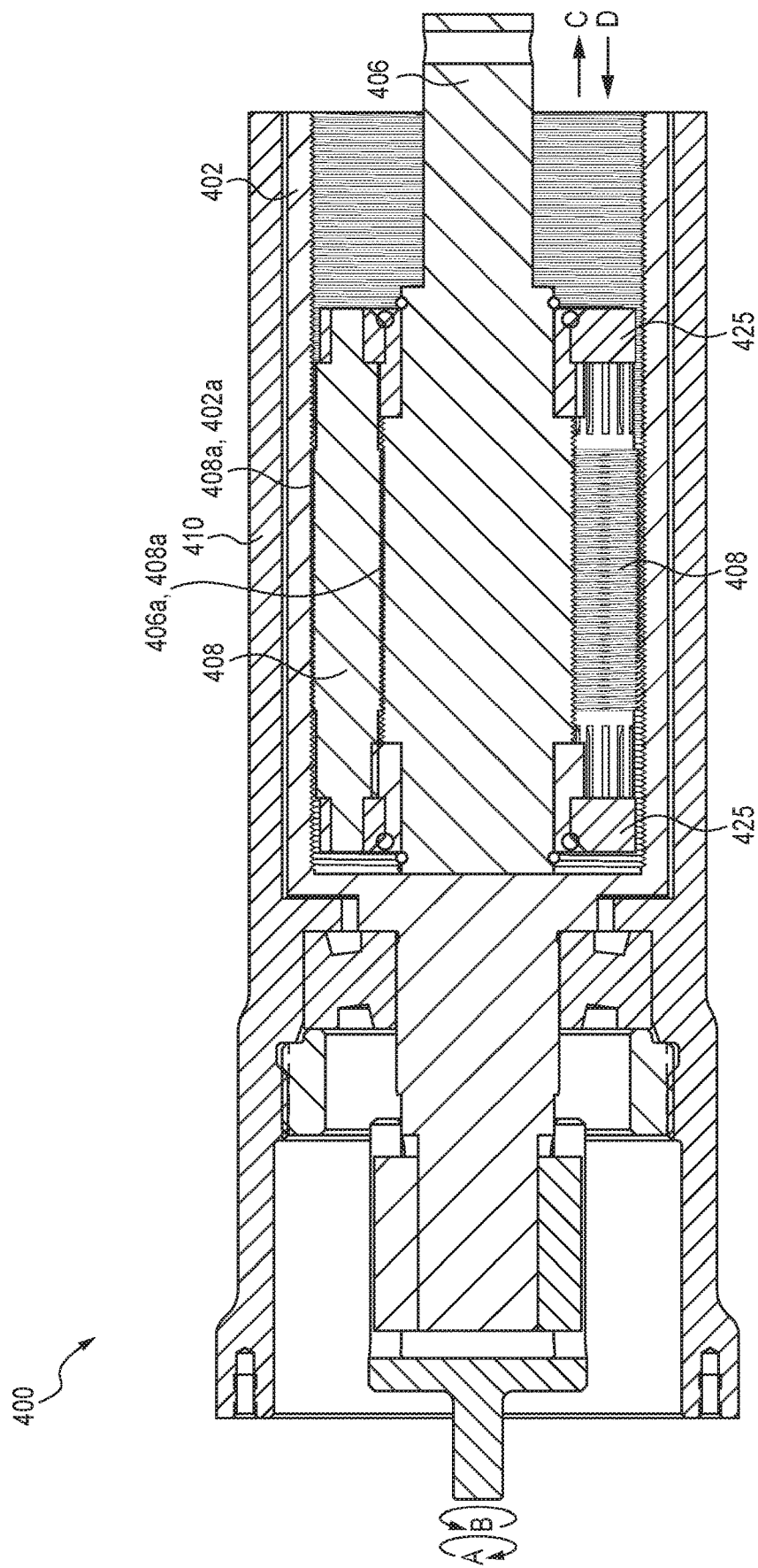
FIG. 24 is a schematic cross sectional view of another alternate roller screw assembly used in tools of the present subject matter.
Figure 25:
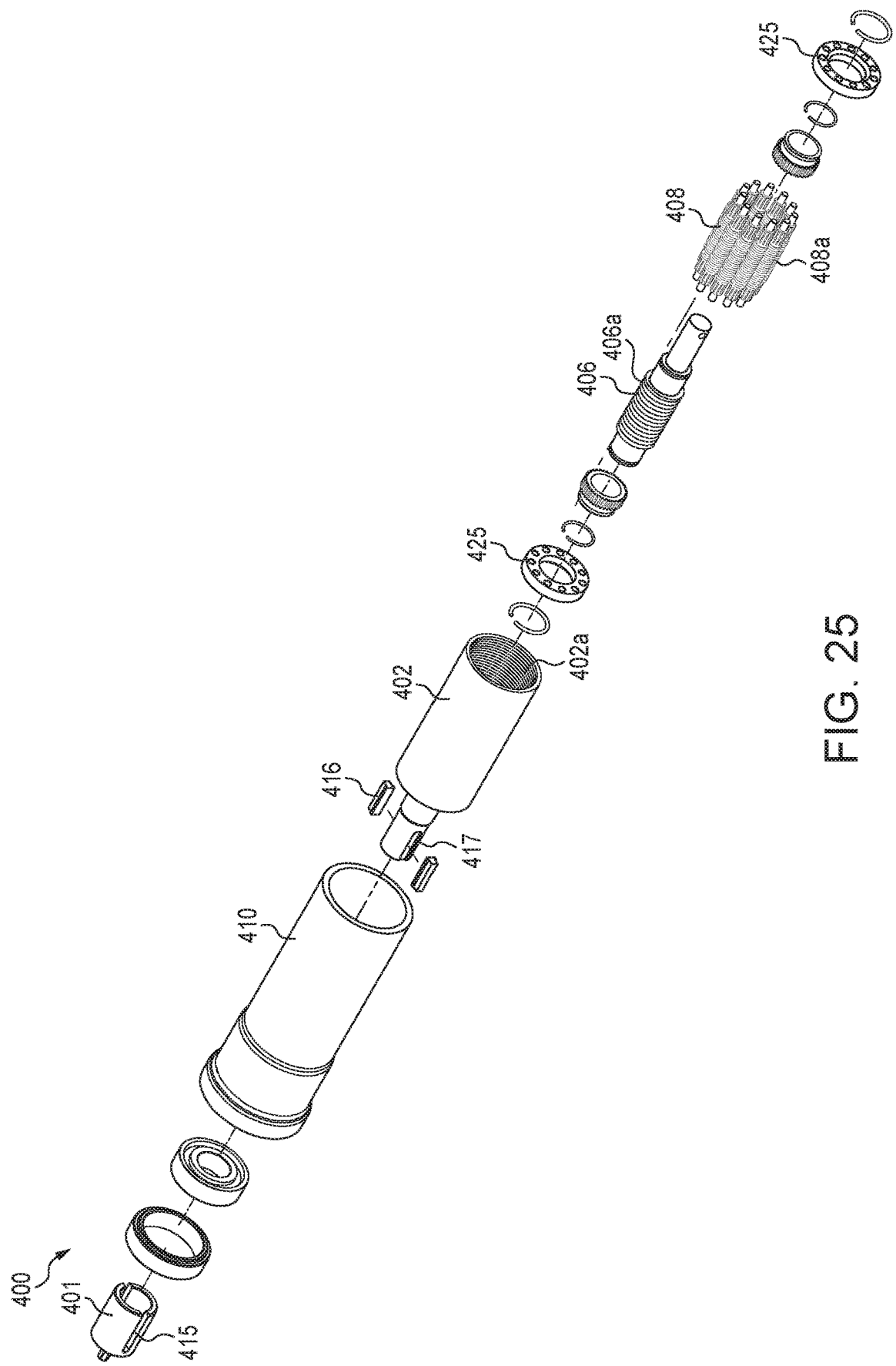
FIG. 25 is an exploded assembly view of the alternate assembly of FIG. 24.

As noted, the present subject matter includes tools that utilize either a standard planetary roller screw or an inverted planetary roller screw. In each version of the planetary roller screw assembly, the assembly can be configured such that upon rotation of the nut, the rod/screw is linearly displaced, or upon rotation of the rod/screw, the nut is linearly displaced. FIGS. 16-25 illustrate representative versions of each of the noted configurations. Specifically, FIGS. 16-18 depict a standard planetary roller screw in which the nut remains with the rollers and the screw is rotated to linearly displace the nut and rollers. FIGS. 19-20 show an inverted planetary roller screw in which the nut moves longitudinally relative to the rollers and so the rollers remain with the screw, and upon rotation of the screw, the nut is linearly displaced. FIGS. 21-23 depict a standard planetary roller screw in which the nut remains with the rollers and the nut is rotated to linearly displace the screw. FIGS. 24-25 illustrate an inverted planetary roller screw in which the nut moves longitudinally relative to the rollers and so the rollers remain with the screw, and upon rotation of the nut, the screw is linearly displaced.

Specifically, FIGS. 16-18 illustrate a standard planetary roller screw 250 in which the nut remains with the rollers and the screw is rotated to linearly displace the nut and rollers. The standard planetary roller screw 250 includes a nut assembly having a first inner nut portion 252, a second inner nut portion 254, a screw 256, and a plurality of rollers 258. The first and second inner nut portions 252, 254 are generally enclosed by a nut housing 260. As described herein, upon rotation of the screw 256 in the direction of A or B in FIG. 16, via powered rotation from the electric motor of the tool, the nut assembly 260 is linearly displaced in either direction C or D. Typically, a key assembly 264, 266 or other alignment provision is provided between a housing 270 and the nut housing 260. Specifically for example, an outwardly projecting ridge 264 can be provided on the nut housing 260 and a corresponding track 266 or engagement region provided with the housing 270. The key assembly 264, 266 enables the nut assembly and plurality of rollers to move axially or longitudinally relative to the screw 256 and the housing 270. The key assembly 264, 266 also precludes rotation of the nut housing 260 relative to the housing 270.

Each roller 258 defines one or more threaded regions having threads that are identical or substantially so, to the threads of the nut portions and different than the threads of the screw. Thus, a roller 258 defines threaded regions having threads 258a that are identical or substantially so, to threads 252a of the first nut portion 252 and to threads 254a of the second nut portion 254. And, the threads 258a of the rollers 258 are different than the threads 256a of the screw 256. And, the rollers 258 also define another threaded region having threads 259a that are identical or substantially so, to threads 256a of the screw 256. The assembly 250 additionally includes one or more roller carriages 275 that rotatably support the rollers 258 and maintain the rollers in a parallel orientation relative to the axis of the screw 256.

FIG. 17 is a schematic cross sectional view of a tool using the roller screw assembly 250 shown in FIG. 16. The linearly displaceable nut assembly 260 is engaged with linkage members 38 and 40 for example, as previously described in conjunction with FIGS. 3, 9, and 10. As will be understood, linear movement of the nut assembly 260 results in opening or closing of the jaws 32, 34.

FIGS. 19 and 20 illustrate an inverted planetary roller screw in which the nut moves longitudinally relative to the rollers and the rollers remain with the screw, and upon rotation of the screw, the nut is linearly displaced. Specifically, the inverted planetary roller screw 300 includes a nut 302, a screw 306, and a plurality of rollers 308. As described herein, upon rotation of the screw 306 in the direction of A or B in FIG. 19 via powered rotation from the electric motor of the tool, the nut 302 is linearly displaced in either direction C or D. Typically, a key assembly 314, 316 or other alignment provision is provided between a housing 320 and the nut 302. Specifically, for example, an outwardly projecting ridge 314 can be provided on the nut housing 302 and a corresponding track 316 or engagement region provided with the housing 320. The key assembly 314, 316 enables the nut 302 and plurality of rollers 308 to move axially or longitudinally relative to the screw 306 and the housing 320. The key assembly 314, 316 also precludes rotation of the nut 302 relative to the housing 320.

Each roller 308 defines one or more threaded regions having threads 308a that are identical or substantially so, to threads 306a of the screw 306 and to threads 302a of the nut 302. The assembly 300 also includes one or more roller carriages 325 that rotatably support the rollers 308 and maintain the rollers in a parallel orientation relative to the axis of the screw 306.

As previously described in association with FIGS. 16-18, the linearly displaceable nut 302 is engaged with linkage members 38 and 40 (not shown in FIGS. 19 and 20) for example depicted in FIGS. 3, 9, and 10. Linear movement of the nut 302 results in opening or closing of jaws 32, 34 (not shown in FIGS. 19 and 20).

FIGS. 21-23 illustrate a standard planetary roller screw in which the nut remains with the rollers and the nut is rotated to linearly displace the screw. Specifically, the standard planetary roller screw 350 includes a nut assembly having a drive nut portion 351, first nut portion 352, a second nut portion 354, a screw 356, and a plurality of rollers 358. The first and second inner nut portions 352, 354 are generally enclosed by a nut housing that includes a first nut housing portion 360 and a second nut housing portion 361. As described herein, upon rotation of the drive nut 351 and corresponding first and second nut portions 352, 354 in the direction of A or B in FIG. 21 via powered rotation from the electric motor of the tool, the screw 356 is linearly displaced in either direction C or D. Typically, a key 364, 366 or other engagement provision is provided between the nut components. Specifically, for example, one or more keys 364 are provided that engage corresponding keyways 365 defined in the drive nut 351 and keyways 367 defined in the nut housing portion 360. And, one or more keys 366 can be provided to engage the first and second nut portions 352, 354 together.

Each roller 358 defines one or more threaded regions having threads that are identical or substantially so, to the threads of the nut portions and different than the threads of the screw. Thus a roller 358 defines threaded regions having threads 358a that are identical or substantially so, to threads 352a of the first nut portion 352 and to threads 354a of the second nut portion 354. And, the threads 358a of the rollers 358 are different than the threads 356a of the screw 356. And, the rollers 358 also define another threaded region having threads 359a that are identical or substantially so, to threads 356a of the screw 356. The assembly 350 also includes one or more roller carriages 375 that rotatably support the rollers 358 and maintain the rollers in a parallel orientation relative to the axis of the screw 356.

FIG. 22 is a schematic cross sectional view of a tool using the roller screw assembly shown in FIG. 21. The linearly displaceable screw 356 is engaged with linkage members 38 and 40 for example, as previously described in conjunction with FIGS. 3, 9, and 10. As will be appreciated, linear movement of the screw 356 results in opening or closing of the jaws 32, 34.

FIGS. 24 and 25 illustrate an inverted planetary roller screw in which the nut moves longitudinally relative to the rollers and so the rollers remain with the screw, and upon rotation of the nut, the screw is linearly displaced. Specifically, the inverted planetary roller screw 400 includes a nut 402, a screw 406, and a plurality of rollers 408. As described herein, upon rotation of the nut 402 in the direction of A or B in FIG. 24, the screw 406 is linearly displaced in either direction C or D. Typically, a key assembly 416 or other engagement provision is provided between a drive nut 401 and the nut 402. Specifically for example, one or more keys 416 can be provided that engage a keyway 415 defined in the drive nut 401 and a keyway 417 defined in the nut 402. A housing 410 generally encloses the components.

Each roller 408 defines one or more threaded regions having threads 408a that are identical or substantially so, to threads 406a of the screw 406 and to threads 402a of the nut 402. The assembly 400 also includes one or more roller carriages 425 that rotatably support the rollers 408 and maintain the rollers in a parallel orientation relative to the screw 406.

As previously described in conjunction with FIGS. 21-23, the linearly displaceable screw 406 is engaged with linkage members 38 and 40 (not shown in FIGS. 24 and 25) for example shown in FIGS. 3, 9, and 10. Linear movement of the screw 406 results in opening or closing of jaws 32, 34 (not shown in FIGS. 24 and 25).

In each of the various planetary roller screw assemblies depicted in FIGS. 16-25, it will be understood that the component that is linearly displaced, i.e., either the screw or the nut in the direction of C or D, is engaged, or ultimately in force-transmitting relationship with the clevis such as clevis 130 to thereby open and close the jaws of the crimp tool. A wide array of assemblies and/or components can be used to transfer the noted linear displacement to the clevis.

In one aspect, the present subject matter provides a handheld crimp tool comprising a tool housing defining a rear housing end and a generally hollow interior adapted for enclosing and supporting at least a portion of the components of the tool. The tool also comprises an electric motor disposed and supported within the tool housing. The tool additionally comprises a planetary roller screw assembly disposed and supported within the tool housing. The screw assembly is engaged with the motor and includes a nut and a screw threadedly engaged with the nut. Upon rotation of one of the nut and the screw, the other of the nut and the screw is linearly and axially displaced. The tool also comprises a movable clevis engageable with one of the nut and the screw. And, the tool comprises a jaw assembly including a first jaw and a second jaw which are positionable between a closed position and an open position.

In another aspect, the present subject matter provides a jaw assembly adapted for engagement with a powered displaceable member. The jaw assembly comprises a first jaw and a second jaw which are positionable between a closed position and an open position. The jaw assembly also comprises a cam linkage member pivotally coupled to the first jaw by a cam pivot pin, and a lever coupled to the first jaw. The lever and the cam linkage member are positioned and configured such that the first jaw and the second jaw can be positioned toward the open position from the closed position by manually moving the lever so as to contact the cam linkage member and pivot the cam linkage member about the cam pivot pin. Each of the first jaw and the second jaw include at least one protruding member that projects from a working surface of a respective jaw, wherein the protruding member is configured to react against forces exerted on die inserts when such die inserts are positioned along the working surface of each of the first and second jaws.

In yet another aspect, the present subject matter provides a handheld crimp tool comprising a tool housing defining a rear housing end and a generally hollow interior adapted for enclosing and supporting at least a portion of the components of the tool. The tool also comprises an electric motor disposed and supported within the tool housing. The tool additional comprises a planetary roller screw assembly disposed and supported within the tool housing. The screw assembly is engaged with the motor and includes a nut and a screw threadedly engaged with the nut, wherein upon rotation of one of the nut and the screw, the other of the nut and the screw is linearly and axially displaced. The tool further comprises a movable clevis engageable with the other of the nut and the screw. And, the tool comprises a jaw assembly including a first jaw and a second jaw which are positionable between a closed position and an open position. The tool also comprises a light assembly disposed on at least one of the tool housing and the jaw assembly. The light assembly is configured to direct light emitted from the light assembly toward a work region proximate the jaw assembly.

In still another aspect, the present subject matter also provides a handheld crimp tool comprising a tool housing defining a rear housing end and a generally hollow interior adapted for enclosing and supporting at least a portion of the components of the tool. The tool additionally comprises an electric motor disposed and supported within the tool housing. And, the tool comprises a planetary roller screw assembly disposed and supported within the tool housing. The screw assembly is engaged with the motor and includes a nut and a screw threadedly engaged with the nut, wherein upon rotation of one of the nut and the screw, the other of the nut and the screw is linearly and axially displaced. The tool also comprises a movable clevis engageable with the other of the nut and the screw. The clevis defines a rear face and movable with respect to a home position defined by a return stop. The tool additionally comprises a jaw assembly including a first jaw and a second jaw which are positionable between a closed position and an open position. And, the tool also comprises at least one flexible element disposed between the rear face of the clevis and the return stop.

In yet another aspect, the present subject matter also provides a method of crimping a fitting or workpiece while avoiding forming partial crimps. The method comprises providing a crimp tool including (i) a tool housing defining a rear housing end and a generally hollow interior adapted for enclosing and supporting at least a portion of the components of the tool, (ii) an electric motor disposed and supported within the tool housing, (iii) a planetary roller screw assembly disposed and supported within the tool housing, the screw assembly engaged with the motor and including a nut and a screw threadedly engaged with the nut, wherein upon rotation of one of the nut and the screw, the other of the nut and the screw is linearly and axially displaced, (iv) a movable clevis engageable with the other of the nut and the screw, (v) a jaw assembly including a first jaw and a second jaw which are positionable between a closed position and an open position, (vi) a trigger that activates the electric motor to thereby result in linear and axial displacement of the other of the nut and the screw, and (vii) a return actuator that upon actuation causes the other of the nut and the screw to be displaced to a home position corresponding to the jaws being positioned to the open position. The method also comprises positioning the jaw assembly to the open position. The method further comprises placing the jaw assembly about a fitting to be crimped. The method additionally comprises maintaining actuation of the trigger such that the electric motor provides rotary power to the planetary roller screw assembly which thereby urges the jaw assembly to the closed position. The method is such that if at any time during closure of the jaw assembly, actuation of the trigger is not maintained such that closure of the jaw assembly is interrupted, the return actuator must be actuated to cause the jaws to be positioned to the open position thereby enabling subsequent actuation of the trigger.

The present subject matter provides numerous advantages. The tools of the subject matter are lightweight and compact. Thus, a tool of the present subject matter can fit into tight spaces during typical installation jobs. The tools require a minimum amount of user effort. Fatigue is reduced and productivity is increased. The tools of the present subject matter deliver a large amount of force without using hydraulics. Thus, the tools are cost effective. The tools of the present subject matter deliver the required force with minimal wear and heat generation. The tools are durable as a result.

Many other benefits will no doubt become apparent from future application and development of this technology.

All patents, applications, standards, and articles noted herein are hereby incorporated by reference in their entirety.

The present subject matter includes all operable combinations of features and aspects described herein. Thus, for example if one feature is described in association with an embodiment and another feature is described in association with another embodiment, it will be understood that the present subject matter includes embodiments having a combination of these features.

As described hereinabove, the present subject matter solves many problems associated with previous strategies, systems and/or devices. However, it will be appreciated that various changes in the details, materials and arrangements of components, which have been herein described and illustrated in order to explain the nature of the present subject matter, may be made by those skilled in the art without departing from the principle and scope of the claimed subject matter, as expressed in the appended claims.

What is claimed is:

1. A jaw assembly adapted for engagement with a powered displaceable member, the jaw assembly comprising:
   a first jaw and a second jaw which are positionable between a closed position and an open position,
   a cam linkage member pivotally coupled to the first jaw by a cam pivot pin;
   a lever coupled to the first jaw;
   wherein the lever and the cam linkage member are positioned and configured such that the first jaw and the second jaw can be positioned toward the open position from the closed position by manually moving the lever so as to contact the cam linkage member and pivot the cam linkage member about the cam pivot pin;
   wherein each of the first jaw and the second jaw include at least one protruding member that projects radially inward from a working surface of a respective jaw, wherein the protruding member is configured to react against forces exerted on die inserts when such die inserts are positioned along the working surface of each of the first and second jaws.

2. The jaw assembly of claim 1 wherein the first jaw includes two protruding members.

3. The jaw assembly of claim 1 wherein the second jaw includes two protruding members.

4. The jaw assembly of claim 1 wherein each of the first jaw and the second jaw includes an affixment pin for retaining the die inserts to the jaws, wherein the protruding members are configured to react against forces exerted on the dies during a crimping operation such that no forces are exerted upon the affixment pins.

5. The jaw assembly of claim 1 further comprising:
   a lever spring to bias the lever and maintain contact between the lever and the cam linkage member.

6. The jaw assembly of claim 1 wherein the protrusions support the die inserts during a crimp operation.

* * * * *